(12) United States Patent
Niikura

(10) Patent No.: US 10,312,685 B2
(45) Date of Patent: Jun. 4, 2019

(54) DEVICE CONTROL APPARATUS

(71) Applicant: DAIKIN INDUSTRIES, LTD., Osaka-shi, Osaka (JP)

(72) Inventor: Nanae Niikura, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 192 days.

(21) Appl. No.: 15/329,570

(22) PCT Filed: Jun. 16, 2015

(86) PCT No.: PCT/JP2015/067271
§ 371 (c)(1),
(2) Date: Jan. 26, 2017

(87) PCT Pub. No.: WO2016/017306
PCT Pub. Date: Feb. 4, 2016

(65) Prior Publication Data
US 2018/0212427 A1    Jul. 26, 2018

(30) Foreign Application Priority Data

Jul. 31, 2014 (JP) .................................. 2014-156193

(51) Int. Cl.
*H01J 3/14* (2006.01)
*G06Q 50/06* (2012.01)
(Continued)

(52) U.S. Cl.
CPC .............. *H02J 3/14* (2013.01); *G05B 13/024* (2013.01); *G06Q 30/0206* (2013.01);
(Continued)

(58) Field of Classification Search
CPC .......... H02J 3/14; H02J 13/00; H02J 13/0006; G05B 13/024; G06Q 30/0206; G06Q 50/06
(Continued)

(56) References Cited

U.S. PATENT DOCUMENTS 7,620,613 B1 * 11/2009 Moore ............... H05K 7/20836
700/28
8,812,165 B1 * 8/2014 Smith ................ G01R 19/2513
700/291
(Continued)

FOREIGN PATENT DOCUMENTS

JP    11-168833 A    6/1999
JP    11-178247 A    7/1999
(Continued)

OTHER PUBLICATIONS

JP2013174418A—Foreign patent English Translation.*
(Continued)

*Primary Examiner* — Sheikh Maruf
(74) *Attorney, Agent, or Firm* — Global IP Counselors, LLP

(57) ABSTRACT

A device control apparatus performs demand response control in which an amount of energy consumed in a predetermined time slot by a facility device is adjusted in accordance with an adjustment request. The device control apparatus includes a reception unit that accepts an operation instruction for the facility device, an expense effect presentation unit and a comfort effect projection. The expense effect presentation unit presents an expense effect incurred on a charge in association with the amount of energy consumed by the facility device through an activity based on the operation instruction. The comfort effect projection unit projects an effect on comfort incurred in a space surrounding the facility device in association with the amount of energy consumed by the facility device through the activity based on the operation instruction.

14 Claims, 11 Drawing Sheets

(51) Int. Cl.
*H02J 13/00* (2006.01)
*H02J 3/14* (2006.01)
*G05B 13/02* (2006.01)
*G06Q 30/02* (2012.01)

(52) U.S. Cl.
CPC ............. *G06Q 50/06* (2013.01); *H02J 13/00* (2013.01); *H02J 13/0006* (2013.01)

(58) Field of Classification Search
USPC .......................................................... 700/32
See application file for complete search history.

(56) References Cited

U.S. PATENT DOCUMENTS

| | | | | |
|---|---|---|---|---|
| 2002/0198629 | A1* | 12/2002 | Ellis ...................... | G06Q 10/06 700/286 |
| 2003/0225483 | A1* | 12/2003 | Santinato ................ | H02J 3/008 700/295 |
| 2004/0138786 | A1* | 7/2004 | Blackett ................... | G01D 4/00 700/295 |
| 2006/0229742 | A1* | 10/2006 | Boutin ................ | G06Q 30/0283 700/32 |
| 2007/0135940 | A1* | 6/2007 | Nelson ................. | G05B 19/042 700/32 |
| 2009/0221253 | A1* | 9/2009 | Yamamoto ........... | H04B 7/0851 455/273 |
| 2010/0274405 | A1* | 10/2010 | Thomas .................... | H02J 3/14 700/295 |
| 2011/0035073 | A1* | 2/2011 | Ozog ............... | G06Q 10/06315 700/291 |
| 2011/0082597 | A1* | 4/2011 | Meagher ................... | H02J 3/38 700/291 |
| 2011/0106321 | A1* | 5/2011 | Cherian .................... | H02J 3/00 700/286 |
| 2011/0106328 | A1* | 5/2011 | Zhou ................. | G05B 13/024 700/291 |
| 2011/0166959 | A1* | 7/2011 | Winter ................... | G06Q 10/04 705/26.25 |
| 2012/0065790 | A1* | 3/2012 | Boy ......................... | H02J 1/14 700/291 |
| 2013/0013124 | A1* | 1/2013 | Park ....................... | G06Q 50/06 700/296 |
| 2013/0030599 | A1* | 1/2013 | Milosevic ................. | H02J 3/14 700/298 |
| 2013/0176130 | A1* | 7/2013 | Hoesl ....................... | F24F 11/30 340/588 |
| 2013/0197676 | A1* | 8/2013 | Salsbury ................. | G05B 13/02 700/32 |
| 2014/0163757 | A1 | 6/2014 | Murayama et al. | |
| 2014/0214228 | A1* | 7/2014 | Park ....................... | G06Q 50/06 700/295 |
| 2015/0066231 | A1* | 3/2015 | Clifton ...................... | G05F 1/66 700/296 |
| 2015/0301546 | A1* | 10/2015 | Hornor ................... | H02J 3/008 700/295 |
| 2016/0149411 | A1* | 5/2016 | Neyhart .............. | H04L 12/2807 700/295 |
| 2016/0170428 | A1* | 6/2016 | Ichien .................... | G06Q 50/16 700/297 |
| 2017/0104330 | A1* | 4/2017 | Nakaishi ................... | H02J 3/14 |
| 2017/0237289 | A1* | 8/2017 | Thompson ................ | H02J 3/00 700/296 |

FOREIGN PATENT DOCUMENTS

| | | | |
|---|---|---|---|
| JP | 11178247 A | * | 7/1999 |
| JP | 2005-283731 A | | 10/2005 |
| JP | 2013-174418 A | | 9/2013 |
| JP | 2013174418 A | * | 9/2013 |
| JP | 2014-115878 A | | 6/2014 |
| JP | 2014-120030 A | | 6/2014 |
| WO | 2010/065197 A2 | | 6/2010 |

OTHER PUBLICATIONS

JP11178247A—Foreign patent Englsih translation.*
European Search Report of corresponding EP Application No. 15 82 6832.6 dated Nov. 7, 2017.
International Search Report of corresponding PCT Application No. PCT/JP2015/067271 dated Aug. 4, 2015.
International Preliminary Report of corresponding PCT Application No. PCT/JP2015/067271 dated Jun. 16, 2015.

* cited by examiner

32a / 32

DEMAND RESPONSE PERIOD: 2015/08/15 10:00-12:00

| OFTEN PERFORMED OPERATIONS | | EXPENSE EFFECT |
|---|---|---|
| ROOM A AIR CONDITIONER | LOWER SET TEMPERATURE BY 2°C | 500 YEN INCREASE |
| ROOM B LIGHTING | TURN ON | 200 YEN INCREASE |
| ROOM B AIR CONDITIONER | OPERATE | 800 YEN INCREASE | a1  a2  a3

FIG. 15

DEVICE CONTROL APPARATUS

CROSS-REFERENCE TO RELATED APPLICATIONS

This U.S. National stage application claims priority under 35 U S C. § 119(a) to Japanese Patent Application No. 2014-156193, filed in Japan on Jul. 31, 2014, the entire contents of which are hereby incorporated herein by reference.

TECHNICAL FIELD

The present invention relates to a device control apparatus for performing control on facility devices that are supplied with energy and that consume energy.

BACKGROUND ART

Recently, methods of handling charges for energy consumption have been devised, such as supply-demand power contract systems that give rewards and/or penalties to consumers complying with requests from a supplier who supplies power, and time-of-use price systems in which prices specific to time slots are set. Developments have been made with regard to demand response that provides stable energy supply, with the balance between energy supply and energy consumption left to the consumer's decisions. Demand response control, whereby facility devices are controlled so as to correspond to this manner of demand response, can be implemented not only with factories and other specific large-scale facilities, but also with common facility devices in office buildings, households, and the like. This manner of demand response includes systems in which it is presumed that the consumer will accept an increase in charges, and it is up to the consumer to decide the amount of energy that will be consumed by the facility devices. With this manner of system, it is anticipated to occur that there are frequent scenarios in which the consumer must select in real time whether to prioritize suppressing energy consumption or to prioritize the activities of the facility devices.

For example, Japanese Laid-open Patent Publication No. H11-168833 discloses a technique of providing target demand rate display means for displaying the ratio of currently used power to a reference power at the current time, whereby the current state is easily understood at a glance. Japanese Laid-open Patent Publication No. 2005-283731 discloses a technique of outputting a message according to a provider service, which changes depending on the time slot, and notifying a user (a consumer).

SUMMARY

Technical Problem

However, in the invention disclosed in Japanese Laid-open Patent Publication No. H11-168833, which pertains to a power management apparatus for monitoring demand to conserve power, a target demand setting means sets a target demand to a target value that is meant to be used to monitor demand. Thus, the technique disclosed in Japanese Laid-open Patent Publication No. H11-168833 is not applicable to a device control apparatus that performs passive demand response control in which the consumer is requested by the supplier to adjust energy consumption. Japanese Laid-open Patent Publication No. 2005-283731 simply states that the consumer is periodically notified of a schedule of the service provided, and does not indicate that the consumer can be assisted with regards to the activities of facility devices subjected to energy adjustment control corresponding to energy consumption adjustment requests intended by the supplier.

An object of the present invention is to provide a device control apparatus that assists the consumer so that the consumer can make an appropriate selection of whether to prioritize suppressing energy consumption or to prioritize the activities of facility devices, with regards to facility devices subjected to energy adjustment control corresponding to energy consumption adjustment requests intended by the supplier.

Solution to Problem

A device control apparatus according to a first aspect of the present invention is a device control apparatus to perform control on an facility device that is supplied with energy and consumes energy, the device control apparatus including a reception unit configured to accept an operation instruction for the facility device, and an expense effect presentation unit configured to present an expense effect incurred on a charge in association with the amount of energy consumed by the facility device through an activity based on the operation instruction.

In the device control apparatus according to the first aspect, since the consumer can select the operation of the facility device while monitoring the expense effect incurred on the charge, which is presented by the expense effect presentation unit, an operation instruction for the facility device can be given to the reception unit while taking the effect incurred on the charge into account.

A device control apparatus according to a second aspect of the present invention is the device control apparatus according to the first aspect, further including: a receiving unit configured to receive charge computation information for computing a charge associated with the amount of energy consumed, the charge computation information being received from a host energy management apparatus that manages energy supplied to the facility device, and a computation unit to estimate a power fluctuation amount caused by the activity based on the operation instruction for the facility device, and to compute an expense effect to be presented by the expense effect presentation unit by applying the estimated power fluctuation amount to the charge computation information received by the receiving unit.

In the device control apparatus according to the second aspect, the power fluctuation amount caused by the activity of the facility device is applied to the charge computation information received by the receiving unit and the expense effect is computed by the computation unit, whereby the expense effect caused by the operation instruction for the facility device is presented. Therefore, the consumer is able to perceive the expense effect that the operation instruction for the facility device causes to the charge, even if the host energy management apparatus changes the charge computation information.

A device control apparatus according to a third aspect of the present invention is the device control apparatus according to the second aspect, wherein the receiving unit receives incentive information from the energy management apparatus, the incentive information being included in the charge computation information and that pertains to a reward for complying with a request associated with energy consumption from the energy management apparatus, and wherein the expense effect presentation unit presents an incentive change as the expense effect, the incentive change being caused in association with the amount of energy consumed by the facility device.

In the device control apparatus according to the third aspect, since the consumer can select the operation of the facility device while monitoring the incentive change presented by the expense effect presentation unit, an operation instruction can be given to the reception unit of the facility device while taking the effect incurred on the incentive into account.

A device control apparatus according to a fourth aspect of the present invention is the device control apparatus according to the third aspect, wherein the computation unit calculates an incentive reduction amount based on the estimated power fluctuation amount, a remaining time in the time slot for which an adjustment of the amount of energy consumed is requested as indicated by the incentive information, and an incentive unit price indicated by the incentive information, and wherein the expense effect presentation unit presents an incentive reduction amount as the expense effect, the incentive reduction amount being calculated by the computation unit.

In the device control apparatus according to the fourth aspect, the incentive reduction can be specifically perceived because the incentive reduction amount is calculated by the computation unit based on the power fluctuation amount, the remaining time, and the incentive unit price.

A device control apparatus according to a fifth aspect of the present invention is the device control apparatus according to any of the second through fourth aspects, wherein the receiving unit receives penalty information from the energy management apparatus, the penalty information being included in the charge computation information and pertaining to a penalty that increases the charge when a request associated with energy consumption from the energy management apparatus is not satisfied, and wherein the expense effect presentation unit presents a penalty as the expense effect, the penalty being caused in association with the amount of energy consumed by the facility device.

In the device control apparatus according to the fifth aspect, since the consumer can select the operation of the facility device while monitoring the penalty presented by the expense effect presentation unit, an operation instruction can be given to the reception unit of the facility device while taking the effect incurred on the penalty into account.

A device control apparatus according to a sixth aspect of the present invention is the device control apparatus according to the fifth aspect, wherein the computation unit calculates a penalty price based on the estimated power fluctuation amount, a remaining time in the time slot for which an adjustment of the amount of energy consumed is requested as indicated by the penalty information, and a penalty unit price indicated by the penalty information, and wherein the expense effect presentation unit presents a penalty price as the expense effect, the penalty price being calculated by the computation unit.

In the device control apparatus according to the sixth aspect, the increase in charge based on the penalty can be specifically perceived because the penalty price calculated by the computation unit is calculated based on the power fluctuation amount, the remaining time, and the penalty unit price.

A device control apparatus according to a seventh aspect of the present invention is the device control apparatus according to any of the second through sixth aspects, wherein the computation unit calculates the computation result of the expense effect using a numerical value, and wherein the expense effect presentation unit presents the expense effect calculated by the computation unit using a numerical value.

In the device control apparatus according to the seventh aspect, a manager or the consumer can perceive the expense effect as a numerical value presented by the expense effect presentation unit.

A device control apparatus according to an eighth aspect of the present invention is the device control apparatus according to any of the third through sixth aspects, wherein the expense effect presentation unit presents a display indicating that the expense effect will not be affected by at least one of the incentive change and the penalty when there is no occurrence of at least one of the incentive change and the penalty caused by the activity of the facility device based on the operation instruction.

In the device control apparatus according to the eighth aspect, when the fact that the incentive change and/or the penalty is unaffected can be confirmed by the display of the expense effect presentation unit, a judgment can be made quickly and reliably when the judgement must be made as to whether or not the operation instruction for the facility device will affect the incentive change and/or the penalty.

A device control apparatus according to a ninth aspect of the present invention is the device control apparatus according to any of the first through eighth aspects, further including a display unit configured to display the effect of device non-activity caused by a situation that the activity is not performed based on the operation instruction for the facility device.

In the device control apparatus according to the ninth aspect, the effect of device non-activity displayed on the display unit and the expense effect presented by the expense effect presentation unit can be compared, and it is easy to issue an operation instruction for the facility device while taking into account both the effect of device non-activity and the effect incurred on the charge.

A device control apparatus according to a tenth aspect of the present invention is the device control apparatus according to the ninth aspect, wherein the facility device is an air conditioner that performs temperature adjustment of indoor temperature, and wherein the display unit displays the effect on the indoor temperature caused by a situation that the temperature adjustment is not performed by the air conditioner.

In the device control apparatus according to the tenth aspect, the effect on the indoor temperature displayed on the display unit and the expense effect presented by the expense effect presentation unit can be compared, and it is easy to issue an instruction to adjust temperature while taking into account both the effect on the indoor temperature and the effect incurred on the charge.

A device control apparatus according to an eleventh aspect of the present invention is the device control apparatus according to any of the first through tenth aspects, wherein the expense effect presentation unit presents the expense effect when the reception unit accepts the operation instruction as a trigger.

In the device control apparatus according to the eleventh aspect, since the receipt of the operation instruction by the reception unit is a trigger for the presentation of an expense effect, an expense effect can be presented every time the operation instruction is accepted.

A device control apparatus according to a twelfth aspect of the present invention is the device control apparatus according to any of the first through eleventh aspects, wherein the expense effect presentation unit presents an expense effect for each set of contents of the operation instruction accepted by the reception unit when the operation instruction includes multiple of contents.

In the device control apparatus according to the twelfth aspect, since the expense effect presentation unit presents multiple expense effects for each set of contents of the operation instruction, the consumer can decide which operation instruction to select, with the accompanying contents, while taking into account the expense effect presented by the expense effect presentation unit.

A device control apparatus according to a thirteenth aspect of the present invention is the device control apparatus according to any of the first through twelfth aspects, wherein the expense effect presentation unit presents the expense effect before or after the activity based on the operation instruction.

In the device control apparatus according to the thirteenth aspect, convenience for the consumer can be improved because the expense effect can be presented regardless of the timing of the activity based on the operation instruction.

A device control apparatus according to a fourteenth aspect of the present invention is the device control apparatus according to any of the first through thirteenth aspects, wherein the reception unit accepts presentation instruction for the expense effect. The expense effect presentation unit presents the expense effect when the reception unit accepts the presentation instruction as a trigger.

In the device control apparatus according to the fourteenth aspect, since the receipt of the presentation instruction by the reception unit is a trigger for presentation of the expense effect, the consumer can have the expense effect presented at any desired timing.

A device control apparatus according to a fifteenth aspect of the present invention is the device control apparatus according to any of the first through fourteenth aspects, further including a comfort effect projection unit. The comfort effect projection unit projects the effect on comfort incurred in the space surrounding the facility device in association with the amount of energy consumed by the facility device through the activity based on the operation instruction. The expense effect presentation unit presents the expense effect and the effect on comfort.

In the device control apparatus according to the fifteenth aspect, the expense effect and the effect on comfort can be compared, and the consumer can make a more reasonable judgment.

A device control apparatus according to a sixteenth aspect of the present invention is the device control apparatus according to any of the first through fifteenth aspects, further including an activity information storage unit and an activity extraction unit. The activity information storage unit stores an activity in association with the expense effect and time information when the activity has been performed based on the operation instruction. The activity extraction unit extracts an activity from the activity information storage unit, which have been performed in the time slot during which adjustment of the amount of energy consumed is requested. The expense effect presentation unit presents the expense effect for the activity extracted by the activity extraction unit.

In the device control apparatus according to the sixteenth aspect, convenience for the consumer can be improved because the consumer can select an operation for the facility device after referring to the operation history of the facility device.

Advantageous Effects of Invention

With the device control apparatus according to the first aspect of the present invention, since the expense effect incurred on the charge is presented by the expense effect presentation unit, the consumer can be assisted so as to make an informed selection of whether to prioritize suppressing energy consumption or to prioritize the activity of the facility device.

With the device control apparatus according to the second aspect of the present invention, it is easy to issue an operation instruction taking the expense effect into account even in cases where the host energy management apparatus sometimes changes the charge computation information.

With the device control apparatus according to the third aspect of the present invention, it is easy to select whether to prioritize suppressing energy consumption or to prioritize the activity of the facility device, by monitoring the incentive change presented by the expense effect presentation unit.

With the device control apparatus according to the fourth aspect of the present invention, operations taking the incentive reduction amount into account are made easier.

With the device control apparatus according to the fifth aspect of the present invention, it is easy to select whether to prioritize suppressing energy consumption or to prioritize the activity of the facility device, by monitoring the penalty presented by the expense effect presentation unit.

With the device control apparatus according to the sixth aspect of the present invention, it is easy to issue operation instructions taking the penalty price into account.

With the device control apparatus according to the seventh aspect of the present invention, the expense effect can be perceived as a numerical value, and it is easy to issue operation instructions taking the expense effect into account.

With the device control apparatus according to the eighth aspect of the present invention, when the facility device is operated while taking the incentive change and/or the penalty into account, the quickness and/or reliability of operation of the facility device can be improved.

With the device control apparatus according to the ninth aspect of the present invention, whether to prioritize suppressing energy consumption or to prioritize the activity of the facility device can be selected more appropriately.

With the device control apparatus according to the tenth aspect of the present invention, it is easy for an operation of the facility device to be performed, which balances keeping the indoor temperature comfortable and the associated expense.

With the device control apparatus according to the eleventh aspect of the present invention, the consumer of the facility device can be encouraged to take the expense effect into account during the operation.

With the device control apparatus according to the twelfth aspect of the present invention, it is easy to select the content of the operation instruction taking the expense effect into account.

With the device control apparatus according to the thirteenth aspect of the present invention, the expense effect can be examined regardless of the timing of the activity based on the operation instruction.

With the device control apparatus according to the fourteenth aspect of the present invention, the expense effect can be examined at any desired timing.

With the device control apparatus according to the fifteenth aspect of the present invention, the expense effect can be examined while taking the effect on comfort into account.

With the device control apparatus according to the sixteenth aspect of the present invention, the expense effect can be examined with reference to operating history.

BRIEF DESCRIPTION OF THE DRAWINGS

FIG. 15 is a drawing for illustrating a screen display of operation contents and expense effects in Modification 1I.

DESCRIPTION OF EMBODIMENTS (1) Form of Contract

In order to achieve demand response (hereinafter sometimes referred to "DR") that allows a consumer who receives a supply of energy to change the demand amount and that makes the balance in energy supply and demand conform, normally there is a contract pertaining to charges between the consumer and a supplier who supplies the energy. Examples of typical contracts implemented for the purpose of demand response between a power supplier who supplies power and a power consumer who receives the supply of power include supply-demand power contract systems and time-of-use price systems.

Examples of typical supply-demand power systems that give incentives and/or penalties to consumers who may or may not comply with requests from a supplier who supplies power include advance reduction amount contract systems and adjustment amount dependent contract systems. In the advance reduction amount contract system, an adjustment amount (kw×time) is contracted in advance, and when this amount is met, it is possible to procure a comparatively higher incentive than with other contract systems. In the adjustment amount dependent contract system, the consumer who receives and complies with a power suppression request can procure an incentive in accordance with the reduced power amount.

Real-time pricing and time-of-use are examples of typical time-of-use price systems in which the unit price of electricity changes in accordance with the urgency of supply and demand. In real-time pricing, price information is provided in real time. In time-of-use, the unit price of electricity to a time slot is set in advance.

(2) Description of Adjustment Amount

Figure 1:
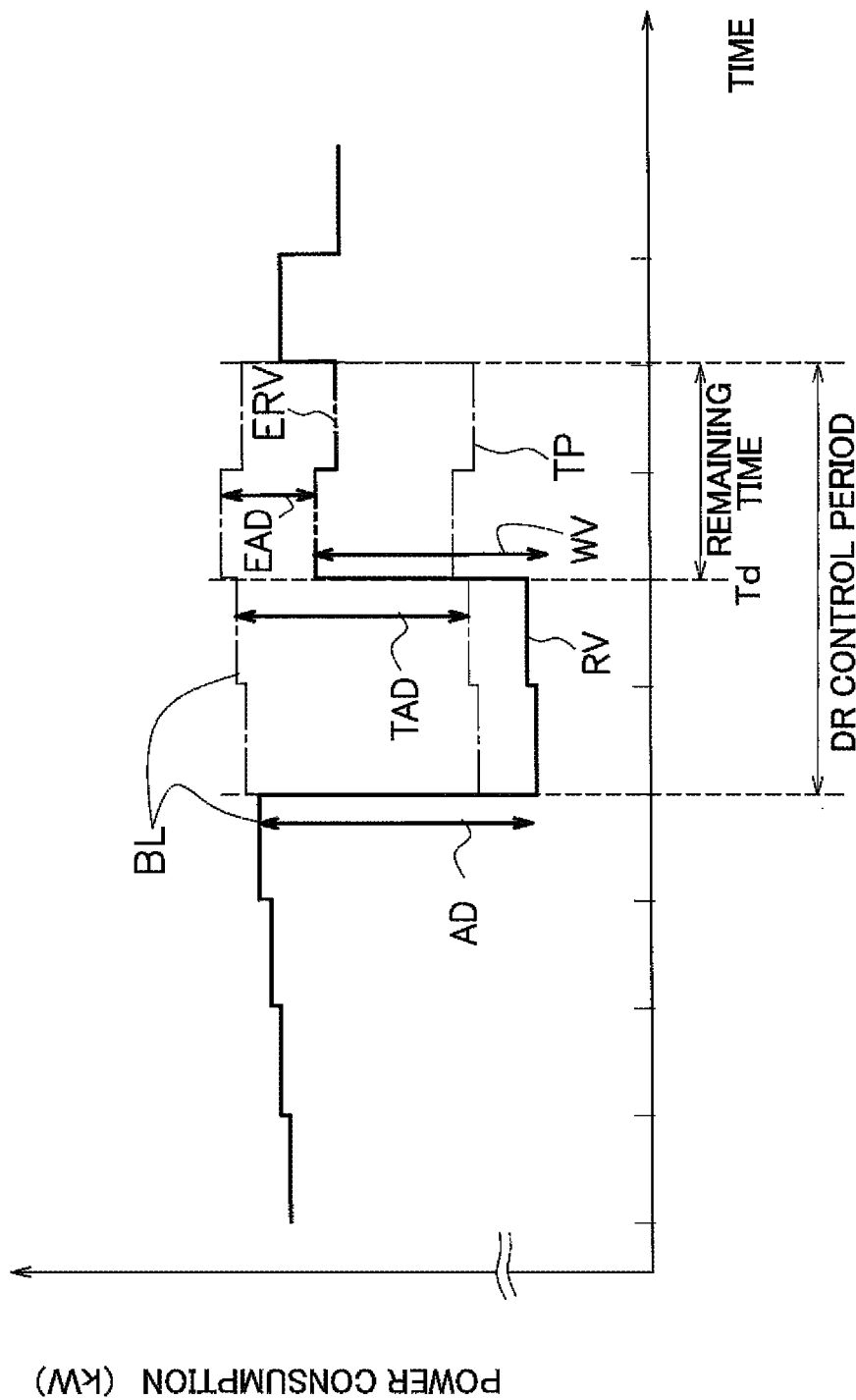
FIG. 1 is a graph for illustrating the relationship between the amount of energy consumed by an facility device and incentives and penalties.

An adjustment amount AD, regarded as the result of energy adjustment control, is defined as the amount obtained by subtracting an actual consumed energy amount from a baseline BL, as shown in FIG. 1. When energy adjustment control is performed, this adjustment amount AD has an effect on the amount of the charge incurred by the consumer's energy usage. The baseline BL used in this definition is the energy amount that an energy consumer either has actually consumed or is supposed to have consumed when the energy adjustment control is not performed. The energy adjustment control is, e.g., demand response control. The energy adjustment control is performed based on a request for energy adjustment control from the supplier of energy adjustment control, and/or information pertaining to energy prices. The energy adjustment control is performed on a facility device operated by the energy consumer.

Figure 2:
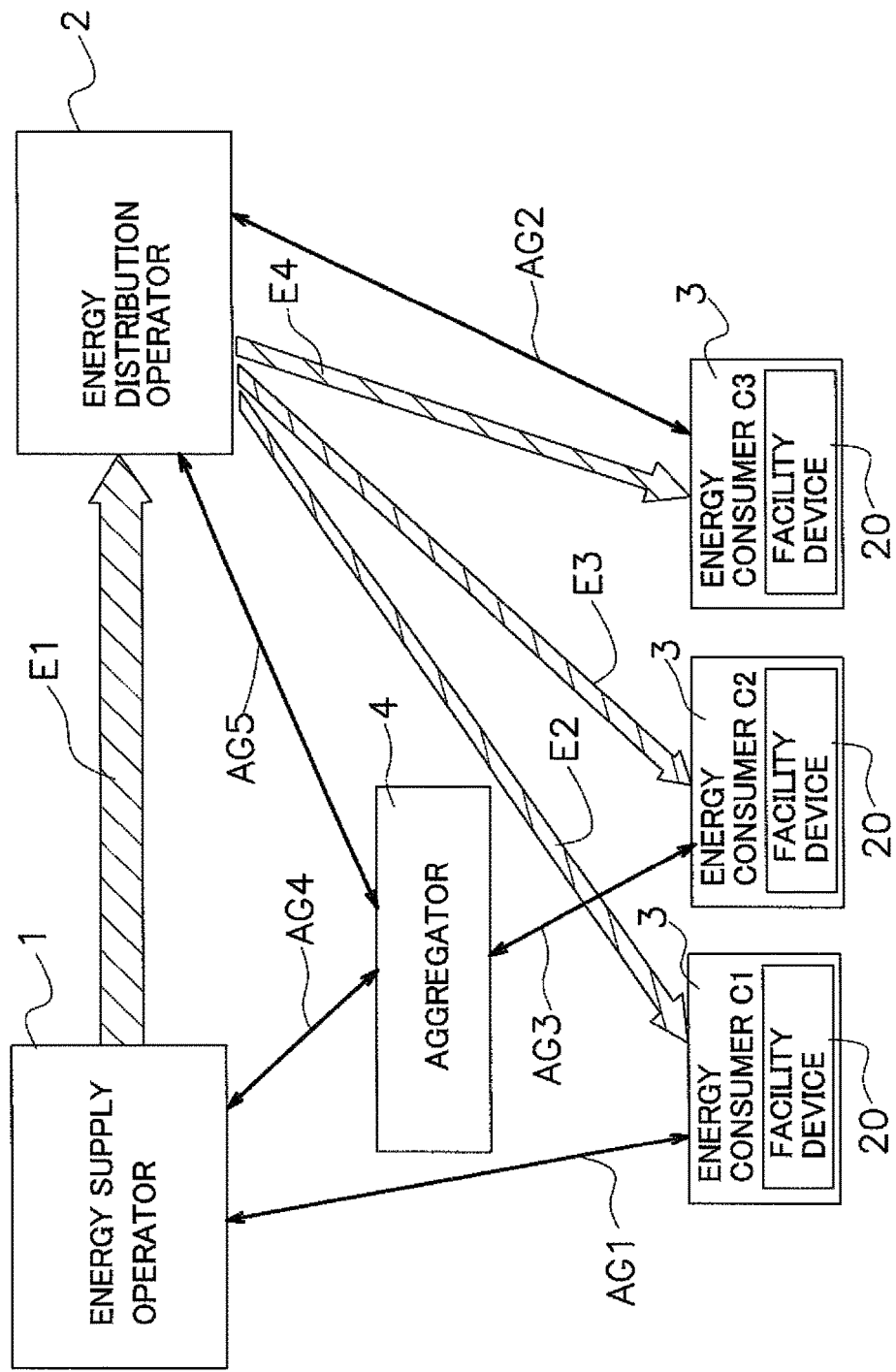
FIG. 2 is a conceptual diagram for illustrating the relationship among an energy supply operator, an energy distribution operator, an aggregator, and consumers.

Typically, energy is sent from an energy supply operator 1 to facilities 3 of an energy consumer C1, an energy consumer C2, and an energy consumer C3, through an energy distribution operator 2, as shown in FIG. 2. The flow of energy from the energy supply operator 1 to the energy distribution operator 2 is represented by an arrow E1, and the flow of energy from the energy distribution operator 2 to the energy consumer C1, the energy consumer C2, and the energy consumer C3 is represented respectively by an arrows E2, E3, and E4. Facility devices 20 that consume the energy are installed in the respective facilities 3 of the energy consumer C1, the energy consumer C2, and the energy consumer C3. The energy supply operator 1 is, e.g., a power generation operator, and the energy distribution operator 2 is, e.g., a power transmission system operator.

Figure 3:
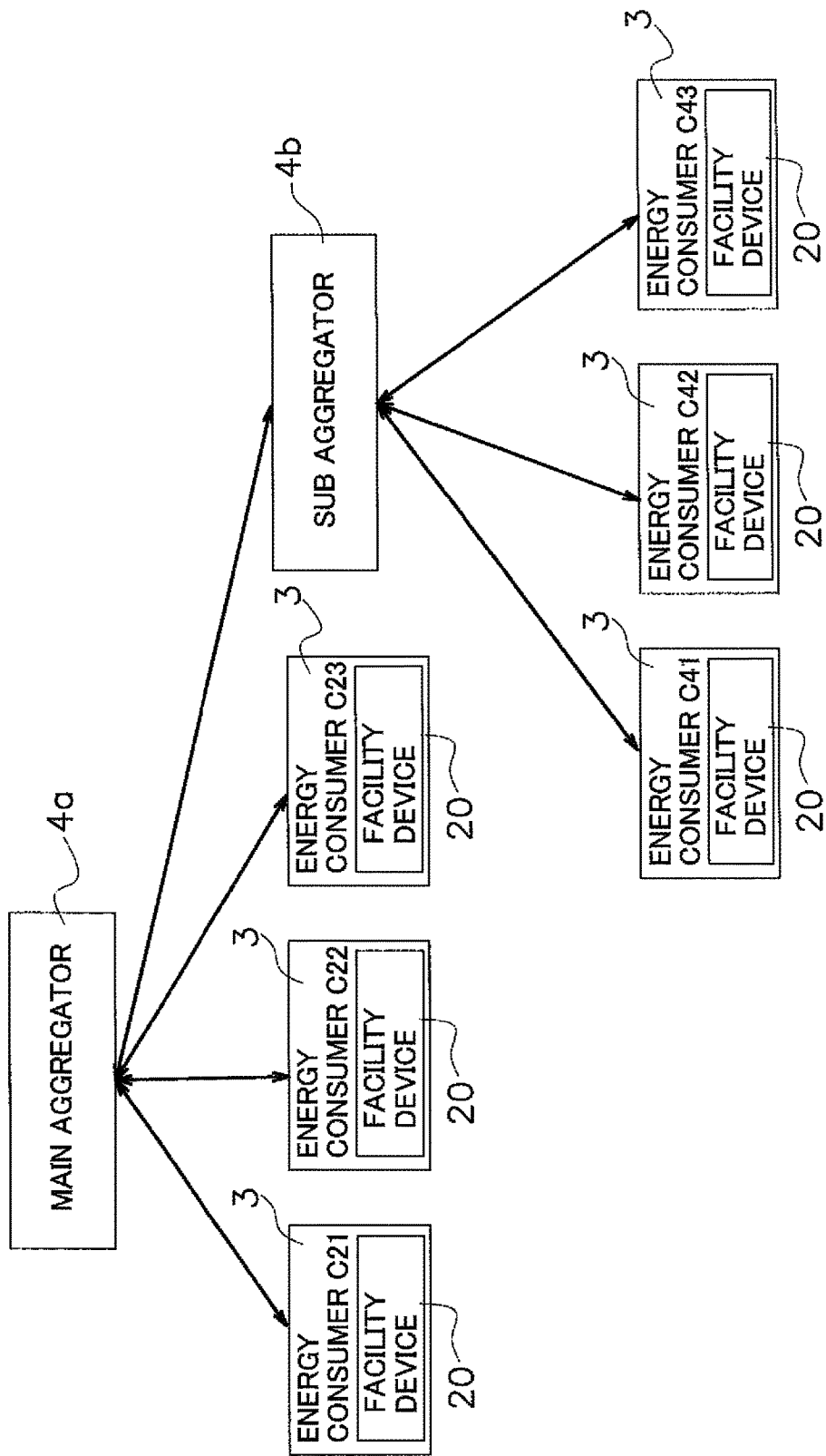
FIG. 3 is a conceptual diagram for illustrating the relationship between aggregators and consumers.

Contracts for the energy adjustment control include, e.g., those such as a contract AG1 implemented directly between the energy consumer C1 and the energy supply operator 1 and/or a contract AG2 implemented directly between the energy consumer C3 and the energy distribution operator 2, but also sometimes include a contract implemented indirectly with the energy supply operator 1 and/or the energy distribution operator 2 via an aggregator 4, such as is the case with the energy consumer C2, as shown in FIG. 2. Contracts AG3, AG4, and AG5 represent contractual relationships that can be implemented among the energy consumer C2, the aggregator 4, the energy supply operator 1, and the energy distribution operator 2. The energy supply operator 1, the energy distribution operator 2, and the aggregator 4 shown in FIG. 2 are part of the supplier group, and there could be one or more of each. There could also be multiple aggregators 4 involved in a hierarchical manner as is the case with a main aggregator 4a and a sub aggregator 4b as shown in FIG. 3. A consumer C21, a consumer C22, and a consumer C23 directly make a contract for energy adjustment control with the main aggregator 4a, as is the case with the energy consumer C2 in FIG. 2. On the other hand, a consumer C41, a consumer C42, and a consumer C43 make a contract for energy adjustment control with the main aggregator 4a via the sub aggregator 4b.

(3) Overall Configuration of Energy Management System

Figure 4:
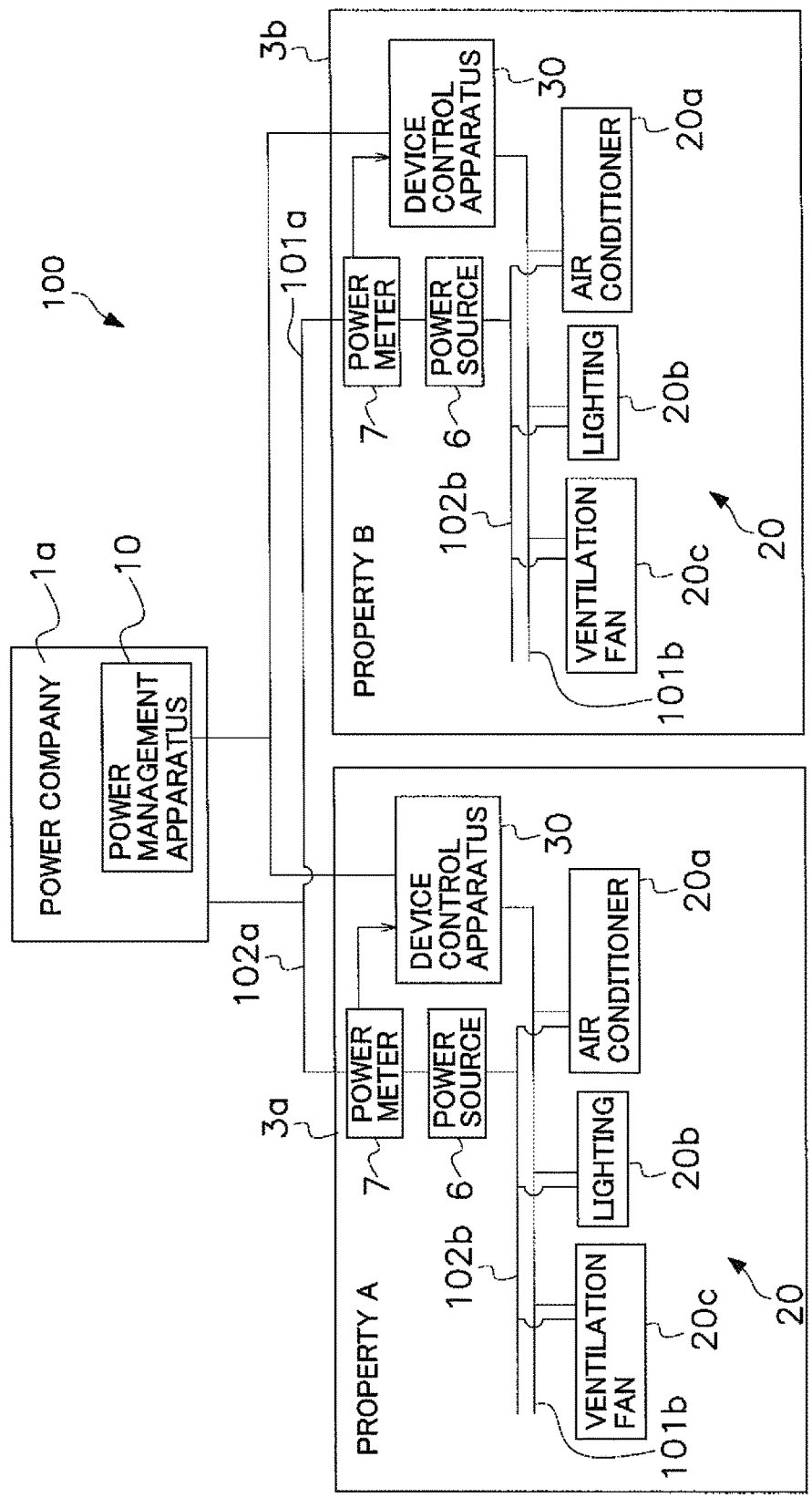
FIG. 4 is a block diagram showing an example of the overall configuration of an energy management system.

For the sake of convenience below, the energy consumed by facility devices controlled by a device control apparatus according to an embodiment of the present invention shall be described as being electrical energy. FIG. 4 shows an energy management system according to an embodiment of the present invention. In the energy management system 100 of FIG. 4, power is supplied from a power company 1a to the facility 3a of a property A and the facility 3b of a property B. The facilities 3a, 3b of the properties A, B are, e.g., office buildings, tenant buildings, factories, common households, or other buildings in which one or more facility devices are installed. The properties A, B are the subjects of contracts having the same contents pertaining to demand response control. In FIG. 4, there are only two properties A, B and two facilities 3a, 3b shown as properties to which the power company supplies power, but the number of properties and the number of facilities are not limited to two.

The power company 1a has a power management apparatus 10. The property A has the facility devices 20, a power source 6 for supplying power to the facility devices 20, a power meter 7 for measuring the amount of power supplied from the power source 6 to the facility devices 20, and a device control apparatus 30 for controlling the facility devices 20. There are multiple types of the facility devices 20 in FIG. 3, including an air conditioner 20a, lighting 20b, and a ventilation fan 20c.

Power is supplied from the power company 1a to the facilities 3a, 3b of the properties A, B, through a power source line 102a. The facility devices 20 inside each property are supplied with power from the power source 6 via an indoor power source line 102b. The power management apparatus 10 and the device control apparatuses 30 are connected through, e.g., the internet 101a. The device control apparatus 30 and the facility devices 20 in each property are connected through a designated control line 101b. The types of facility devices 20 are not limited to the air conditioner 20a, the lighting 20b, or the ventilation fan 20c.

(4) Configurations of Apparatuses

The power management apparatus 10 and the device control apparatuses 30, which are included in the energy management system 100, are described below.

(4-1) Power Management Apparatus 10

Figure 5:
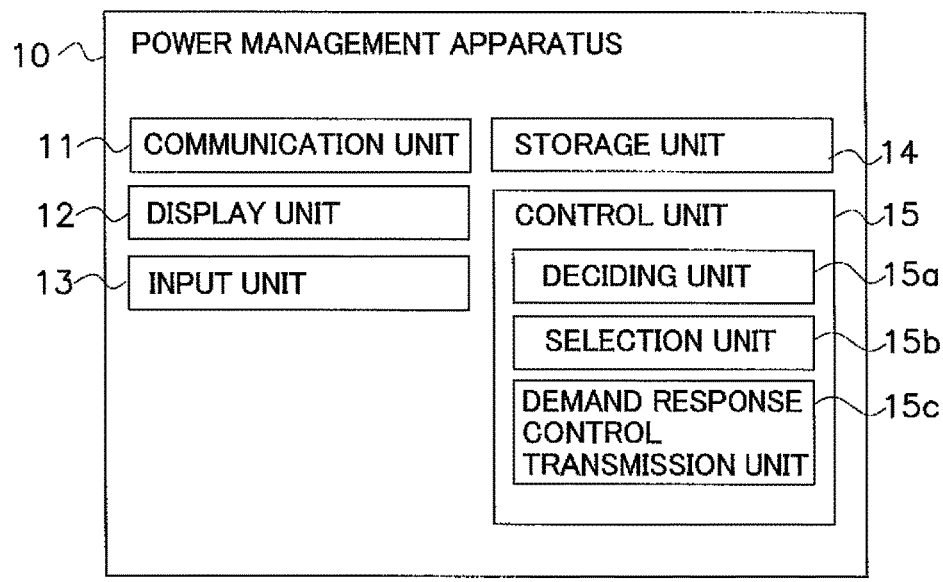
FIG. 5 is a block diagram showing an example of a power management apparatus.

FIG. 5 shows the schematic configuration of the power management apparatus 10. The power management apparatus 10 includes a communication unit 11, a display unit 12, an input unit 13, a storage unit 14, and a control unit 15. The communication unit 11 is a network interface through which the power management apparatus 10 can be connected to the internet 101a. The display unit 12 is configured to include, e.g., a display. The input unit 13 is configured to include, e.g., operating buttons, a keyboard, and a mouse.

The storage unit 14 is configured to include a hard disk. For each property, the storage unit 14 stores a combination of the amount by which and time during which energy can be suppressed, this combination being transmitted from the device control apparatus 30 of the property A or B. The control unit 15 is configured from a CPU, a ROM, and a RAM. By reading and executing programs stored in the storage unit 14 described above, the control unit 15 functions as a deciding unit 15a, a selection unit 15b, a demand response control transmission unit 15c, and a transmission request unit 15d, which are shown in FIG. 5.

The deciding unit 15a estimates the amount of power supply and the amount of demand. When the deciding unit 15a has determined that there is a possibility of the amount of demand exceeding the amount of supply after a predetermined time duration, the deciding unit 15a makes a decision to request a suppression of the amount of energy consumed, such as the electric power or the electric energy, to the properties A, B. Besides, the deciding unit 15a decides for how long and in what amount the power demand must be reduced for the entire energy management system 100. The selection unit 15b selects a time slot and a power suppression amount with which demand response control will be executed for each property, based on the information stored in the storage unit 14 and the time and reduction amount decided by the deciding unit 15a.

The demand response control transmission unit 15c causes the request to perform demand response control, and the time slot and the power suppression amount with which demand response control will be executed as decided by the selection unit 15b, to be outputted from the communication unit 11 to the properties A, B. The power suppression amount is a target adjustment amount in DR control, but it is sometimes not outputted in cases in which the power suppression amount has already been established by the contract or the like.

(4-2) Device Control Apparatus 30

Figure 6:
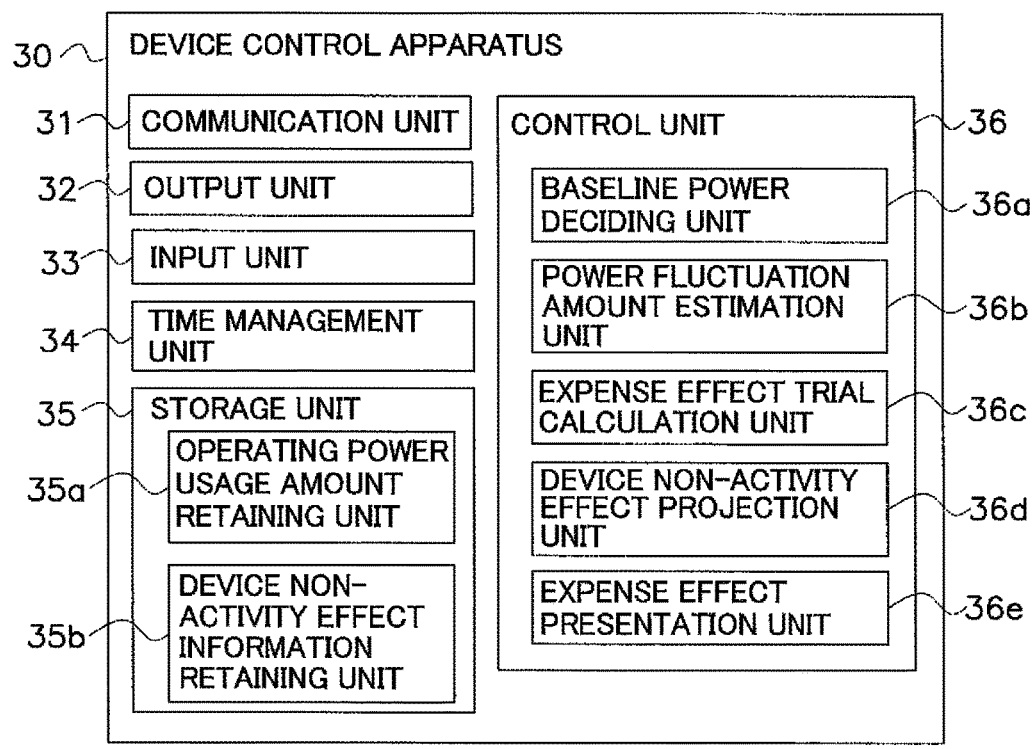
FIG. 6 is a block diagram showing a configuration of a device control apparatus according to one embodiment.

FIG. 6 shows a schematic configuration of the device control apparatus 30. The device control apparatus 30 installed in the property A is described below, but the device control apparatus 30 installed in the property B is configured in the same manner. Each device control apparatus 30 includes a communication unit 31, an output unit 32, an input unit 33, a time management unit 34, a storage unit 35, and a control unit 36.

The communication unit 31 takes on the function of conducting the transmitting and receiving of information between the device control apparatus 30 and the power management apparatus 10, and in this embodiment, conducts communication both ways between the power management apparatus 10 and the communication unit 11 via the internet 101a For this purpose, the communication unit 31 includes, e.g., an internet interface through which the device control apparatus 30 can be connected to the internet 101a.

The output unit 32 is configured to include, e.g., a display. Images representing the operating states of the facility devices 20 are displayed on the display of the output unit 32. The information displayed in the images of the output unit 32 pertains to, e.g., whether the facility devices 20 are on or off, operating modes (e.g., cooling mode/heating mode etc. for the air conditioner 20a), set temperatures, illumination, amount of ventilation, working time, working rate, and operating capability when running. The current power consumption and other parameters are also displayed. Furthermore, when the facility device 20 performs an activity based on an operation instruction inputted from the input unit 33, the output unit 32 displays the expense effect that will be incurred on the charge in relation to the amount of power the facility device 20 will consume.

The input unit 33 is configured to include, e.g., operation buttons and a touch screen covering the display of the output unit 32. The input unit 33 can be used to input start/stop signals for the facility devices 20, setting changes, operation mode changes, and other various commands for the facility devices 20. The time management unit 34 has a clock that is substantially synchronized with the power management apparatus 10 of the power company 1a. The time management unit performs time management on the various controls carried out by the device control apparatus 30.

(4-2-1) Storage Unit 35

The storage unit 35 is configured to include a hard disk capable of storing information transmitted and received by, e.g., the communication unit 31, the output unit 32, and/or the input unit 33. Programs that can be read and executed by the control unit 36, described hereinafter, are stored in the storage unit 35. The storage unit 35 has an operating power usage amount retaining unit 35a and a device non-activity effect information retaining unit 35b.

The operating power usage amount retaining unit 35a retains the power (kW) consumed by the operations of the facility devices 20. The ventilation fan 20c is a type that is manipulated only by being turned on and off, and that consumes a fixed amount of power when operating. The lighting 20b could be a type that is manipulated only by being turned on and off and that consumes a fixed amount of power when operating, but could also be a type of which the illuminance is switched among multiple levels and the power consumption differs with each operation. In the air conditioner 20a, the power consumption during operation differs depending on differences between the cooling mode and heating mode or other operating modes, differences in the set temperature, and/or differences in the outdoor air temperature or other environmental factors. When multiple devices of each type of the facility device 20 are installed, power consumption differs depending on the number of the running devices. The information retained in the operating power usage amount retaining unit 35a is needed in order for a power fluctuation amount estimation unit 36b of the control unit 36, described hereinafter, to make a trial calculation of the power consumption fluctuating due to the operations of the facility devices 20.

The information retained in the device non-activity effect information retaining unit 35b is needed in order for a device non-activity effect projection unit 36d of the control unit 36, described hereinafter, to project effects caused by activity and non-activity of the facility devices 20.

(4-2-2) Control Unit 36

The control unit 36 is configured from, e.g., a CPU, a ROM, and a RAM. By reading and executing programs stored in the storage unit 35 described above, the control unit 36 is able to exhibit the functions of a baseline power deciding unit 36a, the power fluctuation amount estimation unit 36b, an expense effect trial calculation unit 36c, an expense effect presentation unit 36e, and the device non-activity effect projection unit 36d, shown in FIG. 6.

The baseline power deciding unit 36a computes the baseline power based on a calculation method settled on by agreement with the power company 1a. A conventional baseline power calculation method is used to calculate the baseline power, and the information needed to calculate the baseline power is obtained from the control situation of the power company 1a and/or the device control apparatus 30. The common conventional calculation method can be used as the method for calculating the baseline power. For example, an averaging method of calculating the baseline power from an average value of data of multiple days within the same time slot in the past, a regression analysis method of estimating the load of the current day using many variables (past load patterns, weather, day of week, etc.) that affect the load, an equivalent day employing method of finding a day that most resembles the current day from past data and employing this day as a baseline, and a weighted moving average method of calculating the baseline by increasing the weight of data close to the current day, are conventionally known as methods for calculating the baseline power.

When an operation instruction for the facility device 20 is received from the input unit 33 during the DR control period, the power fluctuation amount estimation unit 36b estimates the power fluctuation amount that will occur when the facility device 20 performs the activity based on the operation instruction. The power fluctuation amount estimation unit 36b receives the information needed to estimate the power fluctuation amount corresponding to the operation instruction from the operating power usage amount retaining unit 35a. The power fluctuation amount estimation unit 36b has mathematical formulas or tables needed for estimations for the air conditioner 20a, the lighting 20b, and the ventilation fan 20c, but these mathematical formulas or tables are created with methods that are conventionally well-known in order to compute the power consumption of the air conditioner 20a, the lighting 20b, and the ventilation fan 20c For example, when a value of outside air temperature must be inputted as a parameter to compute the power consumption of the air conditioner 20a, if the air conditioner 20a has an outside air temperature sensor, a measurement result from the outside air temperature sensor is retained in the operating power usage amount retaining unit 35a, and if the air conditioner 20a does not have the outside air temperature sensor, a measurement result from a separately provided outside air temperature sensor is retained in the operating power usage amount retaining unit 35a. Thus, information needed for the power fluctuation amount estimation unit 36b to make an estimation is collected as needed and retained in the operating power usage amount retaining unit 35a.

The expense effect trial calculation unit 36c applies the power fluctuation amount estimated by the power fluctuation amount estimation unit 36b to charge computation information, and computes the amount of increase in the charge associated with the power fluctuation amount. In the case of an adjustment amount dependent contract system of a supply-demand power contract system, for example, the device control apparatus 30 receives a request for DR control from the power management apparatus 10 of the power company 1a.

In the case of the adjustment amount dependent contract system, the charge computation information received from the power company 1a includes, e.g., the DR control period and the incentive unit price. The incentive reduction amount is described using FIG. 1. First, since a target power TP is reached before a time Td at which an attempt is made to change the activity of the facility device 20, the incentive that occurs is (target adjustment amount TAD (kW))×(incentive unit price per 1 kWh). In other words, the charge accrued with the power usage amount at this time would decrease by this computed value. However, when the activity of the facility device 20 is changed at the time Td, a power consumption increase is estimated, which is equivalent to a power fluctuation amount WV that accompanies the change in the activity of the facility device 20. Then, only an estimated adjustment amount EAD, which is less than the target adjustment amount TAD, can be achieved at an estimation result value ERV following the change in the activity of the facility device 20. Therefore, an incentive reduction equivalent to (target adjustment amount TAD−estimated adjustment amount EAD) occurs. The amount of increase in the charge accompanying the incentive reduction amount is equal to (target adjustment amount TAD−estimated adjustment amount EAD)×(incentive unit price per 1 kWh)×(remaining time). To express this in slightly more general terms, the incentive reduction amount is determined based on the power fluctuation amount WV, the remaining time, and the incentive unit price. The reason the incentive reduction amount is based on the power fluctuation amount WV is because the estimated adjustment amount EAD is computed using the power fluctuation amount W V In other words, EAD=BL−(RV+WV). However, when there is a period Z during which the target adjustment amount TAD minus the estimated adjustment amount EAD is zero or a negative value, the incentive reduction amount is zero in this period Z, and the amount of increase is calculated by subtracting the remaining time from this period.

In the case of the advance reduction amount contract system, the charge computation information received from the power company 1a includes, e.g., a DR control period. The target adjustment amount TAD is settled in advance by contract or the like. In the case of the advance reduction amount contract system, when, e.g., the adjustment amount AD and the estimated adjustment amount EAD are less than the target adjustment amount TAD even by a little, the advance contract is no longer fulfilled and the penalty must be paid. Therefore, due to the activity of the facility device 20 being changed at time Td, as in FIG. 1, the duty to pay the penalty unit price, which is fixed regardless of how large or small the estimated adjustment amount EAD may be, is imposed from the stage when the estimated adjustment amount EAD has become less than the target adjustment amount TAD. Therefore, the amount of increase in the charge accompanying the penalty is, in the case of FIG. 1, equal to (target adjustment amount TAD)×(penalty unit price per 1 kWh)×(remaining time). To express this in slightly more general terms, the penalty price would be determined based on the power fluctuation amount WV, the remaining time, and the penalty unit price.

In the case of the time-of-use price system, a price of a time slot given by the power company 1a is set high. In this case, the charge computation information may be received as needed from the power company 1a, and if the information is given in advance, the given charge computation information may be stored in the storage unit 35. In the case of the time-of-use price system, if, e.g., the electricity price for a predetermined time slot is invariably high, the power fluctuation amount WV that accompanies the change in the activity of the facility device 20 contributes to an increase in the electricity price. When the remaining time in FIG. 1 is the remaining time of the time slot during which the electricity price is temporarily high, the amount of the charge increase associated with the change in the activity of the facility device 20 would be equal to, power fluctuation amount WV×(electricity price per 1 kWh)×(remaining time).

Figure 7:
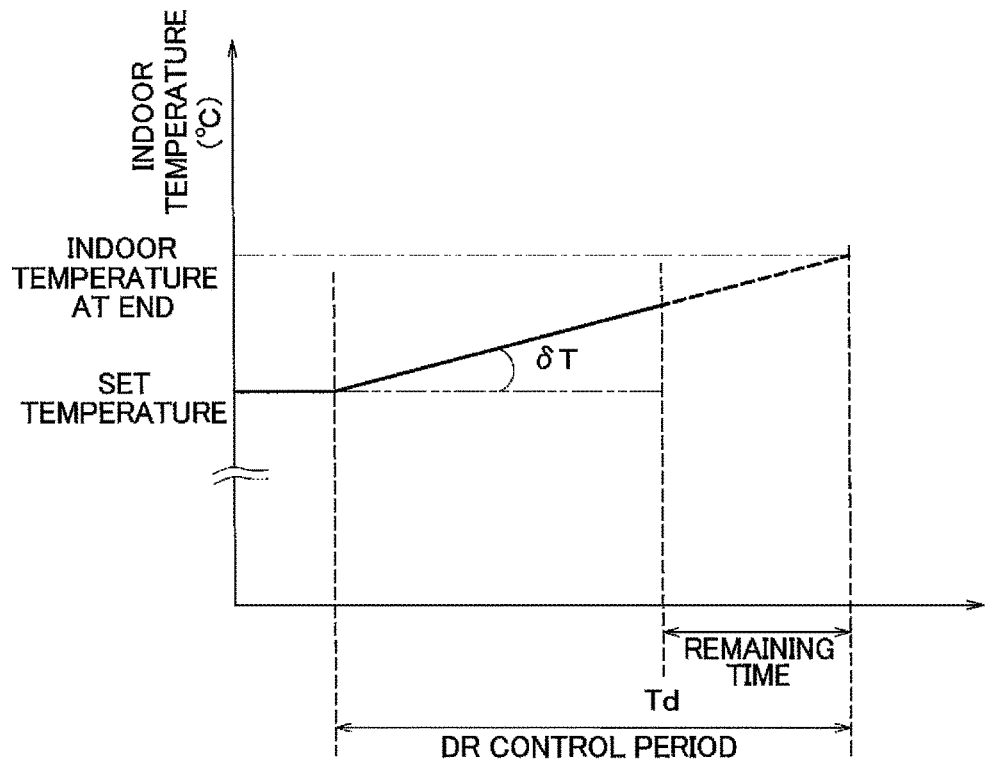
FIG. 7 is a graph for illustrating a method of estimating indoor temperature when a cooling operation is not restarted during a demand response period.

The device non-activity effect projection unit 36d projects the effect of device non-activity caused by the facility device not performing the activity based on the operation instruction. FIG. 7 is used to describe a projection made by the device non-activity effect projection unit 36d, illustrating the example of a projection of the change in the indoor temperature when the air conditioner 20a is not caused to be active. The state shown in FIG. 7 is predicated on a case in which until the DR control period, a cooling operation is performed in which the air conditioner 20a is set to a set temperature, and the outdoor temperature is higher than the set temperature. At the starting time point of the DR control period, the air conditioner 20a is stopped. At the time point Td, when a certain amount of time has elapsed, the consumer inputs an instruction to the input unit 33 to restart the operation of the air conditioner 20a. The device non-activity effect projection unit 36d, upon being notified of the operation instruction to restart the operation of the air conditioner 20a from the input unit 33, begins a projection pertaining to the rise in the indoor temperature when the air conditioner 20a is not operated.

The device non-activity effect projection unit 36d first calculates a slope δ1T from the transition of the indoor temperature during the elapsed time. With the estimation being that the indoor temperature will rise with the same slope, the indoor temperature at the ending time point of the DR period is estimated by multiplying the remaining time by the slope δT (δT×(remaining time)). At this time, the method of estimating the slope δT is that, e.g., the device non-activity effect projection unit 36d calculates an approximate curve using the least-squares method. Another method of estimating the slope δT is that, from a past control history stored by the device non-activity effect information retaining unit 35b when the device control apparatus 30 controlled the facility device 20 in the past, the device non-activity effect projection unit 36d extracts the result of control being performed under the same conditions and uses the result as the indoor temperature at the ending time point of the DR period to calculate the slope.

The expense effect presentation unit 36e presents an expense effect incurred on the charge in association with the power usage amount consumed by the facility device 20 when the facility device 20 performs the activity based on the operation instruction received by the input unit 33. Specifically, the expense effect presentation unit 36e presents the result of the above-described trial calculation performed by the expense effect trial calculation unit 36c and the result of the above-described projection made by the device non-activity effect projection unit 36d. The details of the expense effect presentation made by the expense effect presentation unit 36e are described hereinafter.

(5) Presentation of Expense Effect (5-1) For Judging Only Whether or not Facility Device can be Operated In the description below, several presumptions are added to the case already described using FIG. 7. In other words, until the DR control period (e.g., the time slot from 13:00 to 14:00), the air conditioner 20a of the property A performs the cooling operation while maintaining the indoor temperature at the set temperature, and the outdoor temperature is higher than the set temperature. At the starting time point of the DR control period, the air conditioner 20a is stopped. At the time point Td when a certain amount of time has elapsed, the consumer inputs an instruction to the input unit 33 to restart the cooling operation of the air conditioner 20a The set temperature is 26° C. The property A is the property for which the adjustment amount dependent contract system is established.

Figure 8:
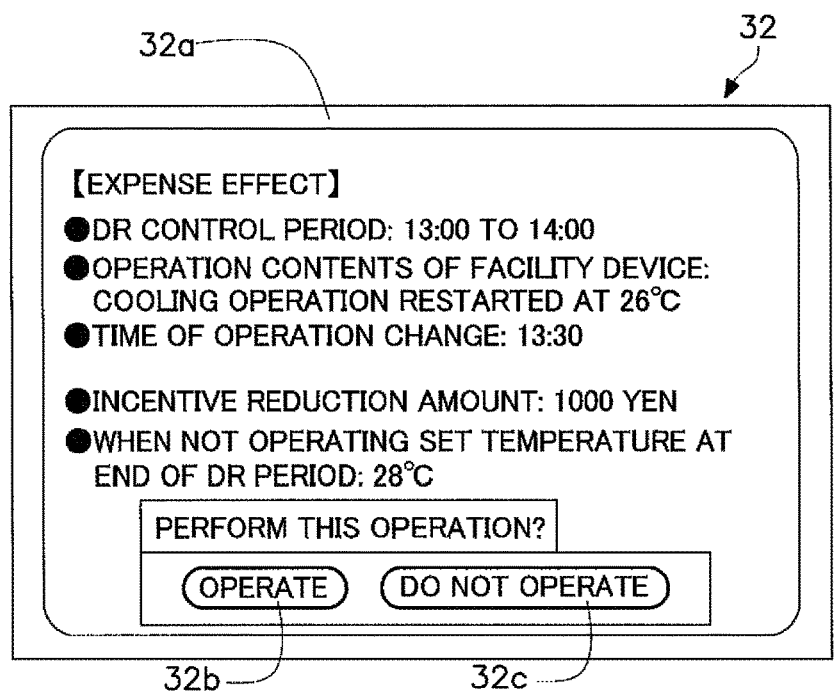
FIG. 8 is a drawing for illustrating a screen display of an expense effect and an effect of device non-activity.

FIG. 8 shows a screen image of a display 32a of the output unit 32, displaying the expense effect and the effect of device non-activity. The screen of the display 32a in FIG. 8 displays the contents pertaining to the expense effect presented by the expense effect presentation unit 36e when the input unit 33 has received the input described above. The image on the display 32a of the output unit 32 is made, when the input of the operation instruction for the air conditioner 20a to the input unit 33 is triggered.

Next is a description of the process up to the time this image is presented on the display 32a. When the information described above is inputted to the input unit 33, the power fluctuation amount estimation unit 36b receives the necessary information from the operating power usage amount retaining unit 35a, and performs a trial calculation for the power fluctuation amount at a time when the cooling operation of the air conditioner 20a in the property A is started at the set temperature of 26° C. For example, it is assumed that the target adjustment amount TAD requested from the electric power company 1a is 1000 kW, the current adjustment amount AD is 1200 kW, and the cooling operation of the air conditioner 20a is started at the set temperature of 26° C. Then, the power fluctuation amount estimation unit 36b estimates that the increase in the power usage amount is 400 kW, which is the power fluctuation amount. The value (target adjustment amount TAD−estimated adjustment amount EAD) estimated by the power fluctuation amount estimation unit 36*b* is then 200 kW.

In this case, with an incentive unit price of 10 yen per 1 kWh, the incentive reduction amount trial-calculated by the expense effect trial calculation unit 36*c* is 200×10×0.5=1000 yen. The device non-activity effect projection unit 36*d*, using the information obtained from the device non-activity effect information retaining unit 35*b*, projects that the indoor temperature at the ending time point of DR control will be 28° C.

When the projection such as this is made, the expense effect presentation unit 36*e* displays the incentive reduction amount trial-calculated by the expense effect trial calculation unit 36*c* and the indoor temperature at the ending time point of the DR control projected by the device non-activity effect projection unit 36*d*, as is shown on the display 32*a* in FIG. 8. At the same time, in order to have the consumer confirm the selection of the operation for the facility device 20, the expense effect presentation unit 36*e* displays a button 32*b* reading "operate" and a button 32*c* reading "do not operate" on the display 32*a* (touch screen). If the consumer presses the button 32*b* of the display 32*a*, the cooling operation of the air conditioner 20*a* is started from 13:30. If the consumer presses the button 32*c* of the display 32*a*, the cooling operation of the air conditioner 20*a* remains stopped until 14:00.

Figure 9:
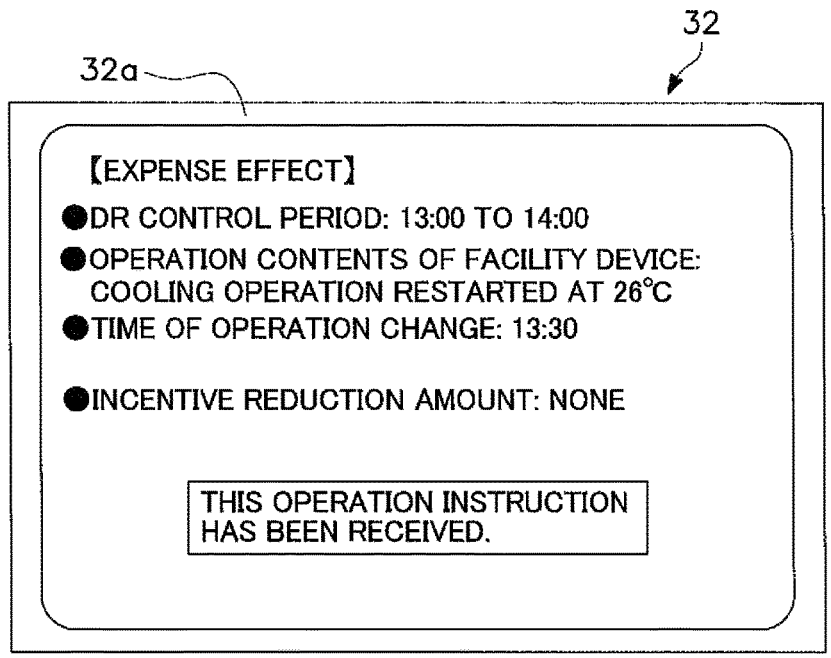
FIG. 9 is a drawing for illustrating a screen display of an output unit when there is no expense effect.

When, as a result of the trial calculation by the expense effect trial calculation unit 36*c*, there is no effect of the air conditioner 20*a* being restarted under the conditions described above, i.e., the computation result is that the incentive reduction amount is 0 yen, the expense effect presentation unit 36*e* displays, e.g., the contents indicating that there is "no effect," such as is shown in FIG. 9, on the display 32*a*. In this case, with a method such as that shown in FIG. 8, it may have the consumer confirm the selection of the operation for the facility device 20. However, since there is no expense effect, the confirmation by the consumer is omitted as shown in FIG. 9.

(5-2) For Selecting Operation Contents of Facility Device

Figure 10:
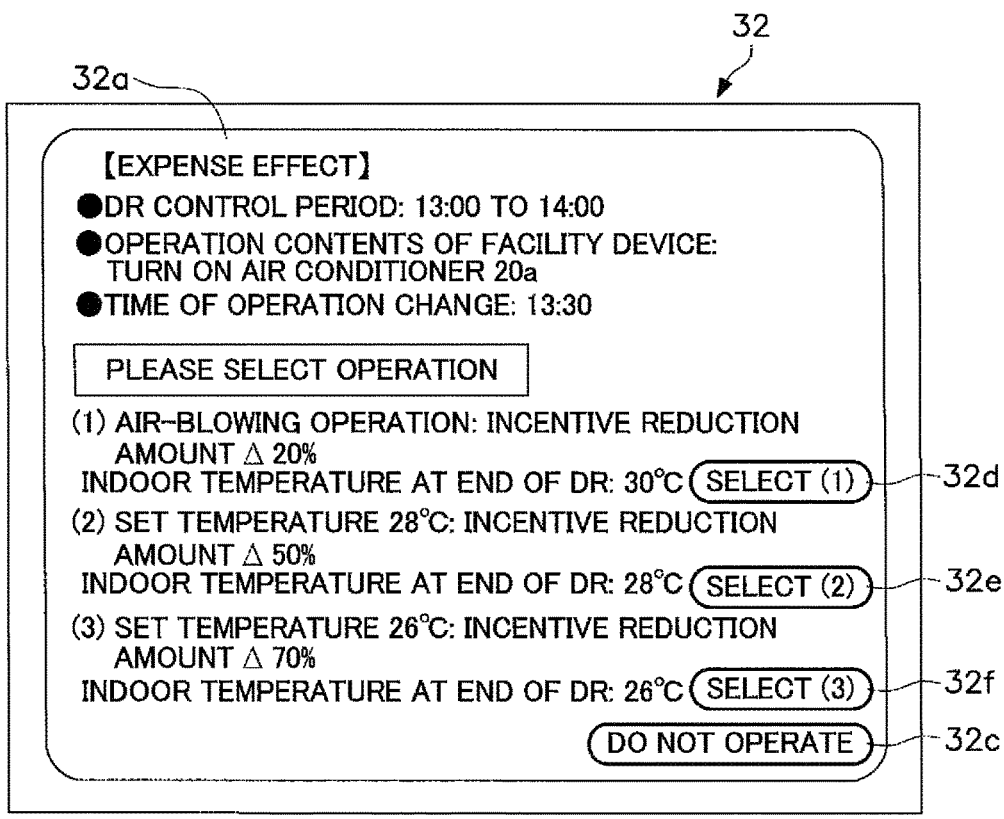
FIG. 10 is a drawing for illustrating a screen display of the expense effect and the effect of device non-activity.

Next, FIG. 10 is used to describe a case in which the consumer is prompted to select an activity for the facility device 20 from multiple types of operation contents. The presuppositions are that until the DR control period (e.g., the time slot from 13:00 to 14:00), the air conditioner 20*a* of the property A is performing the cooling operation at the set temperature of 26° C., and the outdoor temperature is higher than the set temperature. At the starting time point of the DR control period, the air conditioner 20*a* is stopped. At the time point at which a certain amount of time has elapsed, unlike the case described in (5-1), the consumer inputs to the input unit 33 an instruction to merely restart the operation of the air conditioner 20*a*. The property A is then the property for which the adjustment amount dependent contract system is implemented.

FIG. 10 shows a screen of the display 32*a* of the output unit 32, displaying the expense effect and the effect of device non-activity. Displayed on the screen of the display 32*a* in FIG. 10 are the contents pertaining to the expense effect presented by the expense effect presentation unit 36*e* when the input described above is inputted to the input unit 33. The image on the display 32*a* of the output unit 32 is made, when the input of the operation instruction for the air conditioner 20*a* to the input unit 33 is triggered.

Next is a description of the process up to the time this image is presented on the display 32*a*. When the information described above is inputted to the input unit 33, the expense effect presentation unit 36*e* chooses the operation contents that can be selected at the time of starting the operation of the air conditioner 20*a*. In this example, aside from the operation contents for restarting the cooling operation at the set temperature of 26° C., an air-blowing operation and the operation contents for restarting the cooling operation at the set temperature of 28° C. are also chosen by the expense effect presentation unit 36*e*. What sort of operation contents to choose is stored in advance in the storage unit 35, and when, e.g., an operation instruction to restart the operation of the air conditioner 20*a* is made during the DR control period, another possible choice is to display the air-blowing operation and an operation at a set temperature two degrees greater than the set temperature at the starting time point of the DR control period.

The power fluctuation amount estimation unit 36*b* receives the necessary information from the operating power usage amount retaining unit 35*a*, and makes a trial calculation of the power fluctuation amount that will occur when the air-blowing operation of the air conditioner 20*a* in the property A is started, and when the cooling operation is started at the set temperature of 26° C. and the set temperature of 28° C. The device non-activity effect projection unit 36*d* projects the indoor temperature at the ending time point of the DR control using the information obtained from the device non-activity effect information retaining unit 35*b*.

When a projection such as that described above has been made, the expense effect presentation unit 36*e* displays the incentive reduction amount trial-calculated by the expense effect trial calculation unit 36*c*, and the indoor temperature at the ending time point of the DR control projected by the device non-activity effect projection unit 36*d*, as shown on the display 32*a* in FIG. 10. At the same time, the expense effect presentation unit 36*e* displays buttons 32*c*. 32*d*, 32*e*, 32*f* on the display 32*a* (touch screen) in order to have the consumer confirm the selection of the operation for the facility device 20. If the consumer presses the button 32*c* of the display 32*a*, the cooling operation of the air conditioner 20*a* remains stopped until 14:00. If the consumer presses the button 32*d* of the display 32*a*, the air-blowing operation of the air conditioner 20*a* is started from 13.30; if the consumer presses the button 32*e*, the cooling operation is started from 13:30 at the set temperature of 28° C., and if the consumer presses the button 32*d*, the cooling operation is started from 13:30 at the set temperature of 26° C.

When, as a result of the trial calculation by the expense effect trial calculation unit 36*c*, there is no effect of the air conditioner 20*a* being restarted under the conditions described above, i.e, the computation result is that the incentive reduction amount is 0 yen, the expense effect presentation unit 36*e* displays, e.g., the contents indicating that there is "no effect," such as is shown in FIG. 9, on the display 32*a*.

(6) Characteristics (6-1)

As described above, the device control apparatus 30 according to an embodiment of the present invention performs management on the facility device 20 that receives a power supply and consumes power. For the device control apparatus 30 described above, the description deals with electricity as the energy, but the energy dealt with may be something other than electricity, e.g., gas.

The input unit 33 (an example of the reception unit) of the device control apparatus 30 accepts the operation instructions for the facility devices 20. The expense effect presentation unit 36*e* presents the expense effect incurred on the charge associated with the power usage amount consumed by the facility device 20 when the facility device 20 performs the activity based on the operation instruction received by the input unit 33. Since the consumer can select the operations for the facility devices 20 while monitoring the expense effects presented by the expense effect presentation unit 36e, the consumer can give the operation instructions for the facility devices to the input unit 33 while taking the effects incurred on the charge into account.

(6-2)

The communication unit 31 (an example of the receiving unit) receives the charge computation information for computing the charge associated with the power usage amount from the host power management apparatus 10, which manages the energy supplied to the facility devices 20. The power fluctuation amount estimation unit 36b and the expense effect trial calculation unit 36c configure a computation unit that estimates the power fluctuation amount caused by the activity based on the operation instruction for the facility device 20, and that applies the estimated power fluctuation amount to the charge computation information received by the communication unit 31 to compute the expense effect presented by the expense effect presentation unit 36e Therefore, even if the host power management apparatus 10 changes the charge computation information, the consumer will be able to perceive the expense effect that the operation instruction for the facility device 20 will have on the charge, and the consumer can be assisted to make an appropriate selection of whether to prioritize suppressing the power usage amount or to prioritize the activity of the facility device 20.

(6-3)

From the power management apparatus 10, the input unit 33 receives the incentive unit price pertaining to the reward for complying with a request associated with the power usage amount from the power management apparatus 10, and the information pertaining to the DR control period (examples of the incentive information), which are included in the charge computation information. The expense effect presentation unit 36e then presents, as the expense effect, the incentive reduction amount that will occur in association with the power usage amount consumed by the facility device 20 (an example of the incentive change). The consumer can issue an operation instruction for the facility device 20 using the buttons 32b to 32e on the touch screen of the input unit 33 while taking into account the effect incurred on the incentive, and it is easier for the consumer to select whether to prioritize suppressing the power usage amount or to prioritize the activity of the facility device 20.

(6-4)

As described above, in the power fluctuation amount estimation unit 36b and the expense effect trial calculation unit 36c (examples of the computation units), the amount of insufficiency with respect to the target adjustment amount TDA can be found from the power fluctuation amount WV, and the remaining time in the DR control period and the incentive unit price can be multiplied by the amount of insufficiency to calculate the incentive reduction amount as the expense effect. If the result is seen on the display 32a of the output unit 32 in FIG. 8, the expense effect can be specifically perceived at a glance, and operations taking the incentive reduction amount into account are made easier.

(6-5)

From the power management apparatus 10, the input unit 33 receives a penalty unit price pertaining to a penalty incurred when a request associated with the power usage amount from the power management apparatus 10 is not complied with, and the information pertaining to the DR control period (examples of the penalty information), which are included in the charge computation information. The expense effect presentation unit 36e then presents, as the expense effect, the penalty that will occur in association with the power usage consumed by the facility device 20. The consumer can issue an operation instruction for the facility device 20 using the touch screen of the input unit 33 while taking the effect the penalty has on the charge into account, and it is easier for the consumer to select whether to prioritize suppressing the power usage amount or to prioritize the activity of the facility device 20.

(6-6)

As described above, in the power fluctuation amount estimation unit 36b and the expense effect trial calculation unit 36c (examples of the computation units), insufficiency with respect to the target adjustment amount TDA can be found from the power fluctuation amount WV, a nonattainment time duration can be found, which is a time of insufficiency during the remaining time of the DR control period, and the penalty unit price can be multiplied by this nonattainment time duration to calculate a penalty price as the expense effect. If the result is seen on the display 32a of the output unit 32, the expense effect can be specifically perceived at a glance, and it is easier to issue an operation instruction taking the penalty price into account.

(6-7)

The expense effect is displayed on the display 32a of the output unit 32 as a numerical value, such as "1000 yen" or "Δ 20%." Since the expense effect can be specifically perceived with such a numerical value, it is easier to issue an operation instruction taking the expense effect into account.

(6-8)

As described using FIG. 9, when there is no expense effect even though the activity of the facility device 20 is changed during the DR control period in accordance with the operation instruction, this information is displayed on the display 32a of the output unit 32. When a judgment must be made as to whether or not executing the operation instruction for the facility device will affect the incentive change and/or the penalty, the quickness and/or reliability of the operation of the facility device can be improved.

(6-9)

The display 32a of the output unit 32 (an example of the display unit) is configured so as to display the effect of device non-activity caused by the activity based on the operation instruction for the facility device 20 not being performed. A comparison between the effect of device non-activity displayed on the display 32a and the expense effect presented by the expense effect presentation unit 36e makes it easier to issue the operation instruction for the facility device 20 while taking both the effect of device non-activity and the effect incurred on the charge into account. As a result, whether to prioritize suppressing the power usage amount or to prioritize the activity of the facility device 20 can be selected more appropriately.

(6-10)

When the facility device 20 is the air conditioner 20a, the effect on the indoor temperature caused by the air conditioner 20a not making a temperature adjustment is displayed on the display 32a of the output unit 32. A comparison between the effect on the indoor temperature displayed on the display 32a and the expense effect presented by the expense effect presentation unit 36e makes it easier to issue an instruction to adjust temperature while taking both the effect on the indoor temperature and the effect incurred on the charge into account. For example, if the indoor temperature is allowed to rise to 28° C. the electric price (the charge)

can be reduced by 1000 yen, and the consumer therefore easily cancels the operation instruction for the facility device 20. As a result, it is easy to have the facility device 20 perform the operation that balances keeping the indoor temperature comfortable and the associated expense.

(6-11)

The expense effect presentation unit 36e presents the expense effect when it receives the operation instruction from the input unit 33 as a trigger, whereby the expense effect can be presented on the display 32a every time the operation instruction is received, and the consumer of the facility device 20 can be prompted to consider the expense effect during the operation.

(6-12)

As described using FIG. 10, when there are multiple types of contents for operation instructions that can be received by the input unit 33, the expense effect presentation unit 36e presents the expense effect for each type of operation instruction contents. Due to the multiple expense effect being presented for each type of operation instruction contents, the consumer can select the operation instruction of any contents while taking the expense effect presented by the expense effect presentation unit 36e into account, and it is easy for the consumer to select operation instruction contents while taking the expense effects into account. For example, when the operation of the air conditioner 20a is restarted, one possible case is that the incentive reduction is 70% if the set temperature is 26° C., while the incentive reduction is no higher than 50% if the air conditioner is restarted at the set temperature of 28° C., and the consumer decides to restart the air conditioner at the set temperature of 28° C.

(6-13)

As described above, the device control apparatus 30 according to an embodiment of the present invention performs control on the facility devices 20 that are supplied with power and that consume power, the device control apparatus being provided with the input unit (the reception unit) 33 that accepts operation instructions for the facility devices 20, and the expense effect presentation unit 36e that presents expense effects that will be incurred on the charge in association with the amount of power consumed by the facility devices 20 through the activities based on the operation instructions. Since the device control apparatus 30 has the configuration described above, the consumer is constantly presented with the expense effects when the operation instructions are received, regardless of whether or not the operations indicated by the operation instructions are executed by the facility devices 20. Therefore, with the device control apparatus 30, the consumer can be assisted so as to be able to make an appropriate selection of whether to prioritize suppressing the power consumption or to prioritize the activities of the facility devices 20.

(7) Modifications (7-1) Modification 1A

In the above embodiment, FIGS. 8 and 10 are used to describe an example in which, when the cooling operation of the air conditioner 20a is not restarted, the estimated indoor temperature at the ending time point of the DR control period is displayed on the display 32a of the output unit 32. The effect of device non-activity at the time when the facility device 20 is thus not activated as per the operation instruction may be displayed as an estimated amount of change at the ending time point of the DR control period. The estimated room temperature or the estimated amount of change at the ending time point of the DR control period may also be used as a basis for displaying levels. For example, if the estimated amount of change is 1° C. or less, "Level 1" is displayed, and if the estimated amount of change is 2° C. or less, "Level 2" is displayed.

(7-2) Modification 1B

The case is described in which the display trigger for displaying a screen on the display 32a shown in FIGS. 8 through 10 is made during the DR control period and is the input of the operation instruction for the facility device 20 to the input unit 33. However, the display trigger may be the "start of the DR control period," in which case the expense effect and/or the effect of device non-activity may be constantly displayed on the screen of the display 32a during the DR period. Also, a display trigger can be made at the timing at which a predetermined threshold value is exceeded. For example, when the cooling operation of the air conditioner 20a is stopped at the time of starting of the DR control, the indoor temperature exceeding the threshold value of 28° C. may be the display trigger for the expense effect and/or the effect of device non-activity to be displayed. The display trigger can be used, not only for the display, but also as a trigger for notification by alarm.

(7-3) Modification 1C

In the example described using FIG. 8, one item each is displayed for the expense effect and for the effect of device non-activity on the screen of the display 32a. Another option is for not only one item to be displayed on the screen of the display 32a in this manner, but also for displays of multiple items to be made while the screen is undergoing an automatic transition. The display 32a can also be configured so that the displayed items (the screen) is switched when the consumer touches the touch screen.

(7-4) Modification 1D

FIG. 9 is used to describe the case in which the display 32a displays that there is no expense effect when the expense effect does not occur in accordance with the operation instruction for the facility device 20. However, another option is to not perform a display when the expense effect does not occur.

Another possibility is to also display a function to cancel the DR control on the display 32a of the output unit 32. Specifically, when a stipulated level is estimated to be exceeded, the explanation "the stipulated level is estimated to be exceeded" can be displayed, and a DR cancel button can be displayed in parallel on the display 32a of the output unit 32. For example, when the air conditioner 20a stops during the DR control period and the indoor temperature is estimated to exceed 30° C. (the stipulated level) during the DR control period, the DR cancel button may be displayed on the display 32a of the output unit 32, and this button may function as the touch screen of the input unit 33 and may receive an instruction to cancel the DR control. In such a case, a dialog box prompting the DR control cancellation may be displayed on the display 32a instead of the DR cancel button being displayed.

(7-5) Modification 1E

Figure 11:
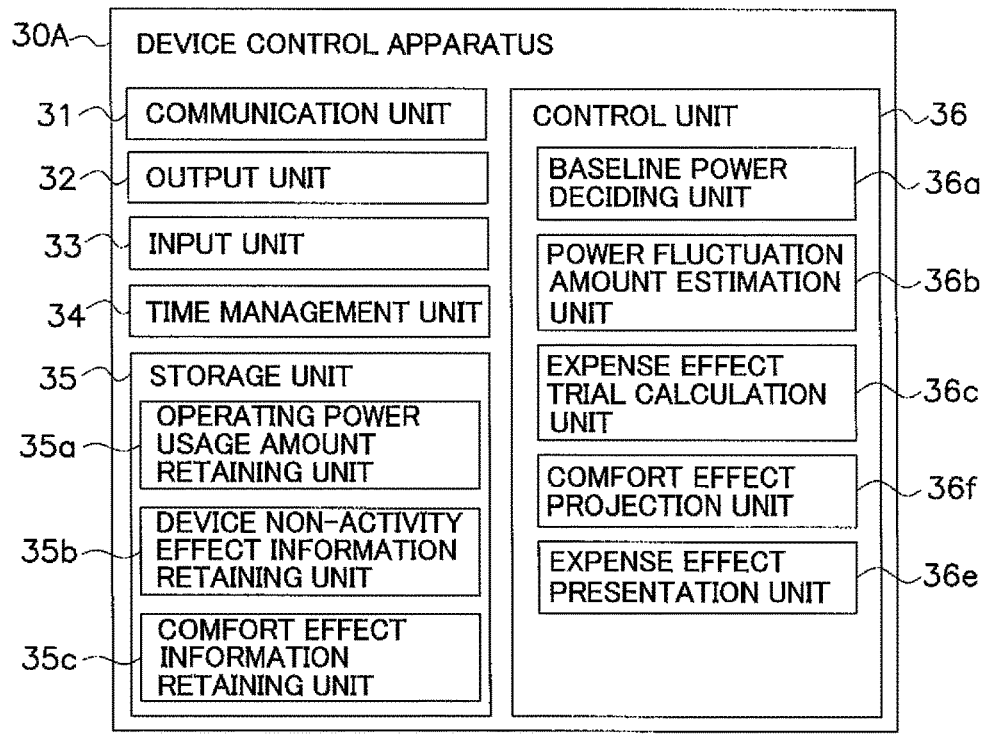
FIG. 11 is a block diagram showing a configuration of a device control apparatus 30A according to Modification 1E.

A device control apparatus 30A in an embodiment of the present invention may have a comfort effect projection unit 36f, as shown in FIG. 11. In this modification, the device control apparatus 30A is configured to have the comfort effect projection unit 36f instead of the device non-activity effect projection unit 36d.

The comfort effect projection unit 36f projects the effect on comfort incurred in the space surrounding the facility device 20 in association with the amount of energy consumed by the facility device due to the activity based on the operation instruction. The term "comfort" refers to the degree of comfort in the space surrounding the facility device 20, and is represented by the indoor temperature or the like where the air conditioner is installed when, e.g., the facility device 20 is an air conditioner. The same method used for the projection made by the device non-activity effect projection unit 36d can be used for the projection made by the comfort effect projection unit 36f, as is demonstrated below. First, in the case of a projection of the change in the indoor temperature when the output of the air conditioner 20a is suppressed, the air conditioner 20a performs the cooling operation at the set temperature until the DR control period, and the outdoor temperature is higher than the set temperature. The output of the air conditioner 20a is then suppressed at the starting time point of the DR control period. Then, at a time point at which a certain amount of time has elapsed, an operation instruction is issued for an output restoration, which returns the output of the air conditioner 20a to the state prior to the DR control Upon notification that there has been the operation instruction for the output restoration of the air conditioner 20a, the comfort effect projection unit 36f begins to project the rise in the indoor temperature when the output of the air conditioner 20a is suppressed. Specifically, the comfort effect projection unit 36f calculates the slope δT from the transition of the indoor temperature during the elapsed time. With the estimation that the indoor temperature will rise with the same slope, the remaining time is multiplied by the slope δT (δT×(remaining time)) to estimate the indoor temperature at the ending time point of the DR period. At this time, the method of estimating the slope δT is that the comfort effect projection unit 36f calculates an approximate curve using, e.g., the least-squares method. Another method of estimating the slope δT is that, from the past control history stored by the comfort effect information retaining unit 35c of the storage unit 35 when the device control apparatus 30A controlled the facility device 20 in the past, the comfort effect projection unit 36f extracts the result of control being performed under the same conditions and uses this result as the indoor temperature at the ending time point of the DR period to calculate the slope.

As described above, the device control apparatus 30A according to Modification 1E includes the comfort effect projection unit 36f, which projects the effect on comfort incurred in the space surrounding the facility device 20 in association with the amount of energy consumed by the facility device 20 due to the activity based on the operation instruction. In this case, the expense effect presentation unit 36e presents the expense effect and the effect on comfort on the display 32a. The consumer is thereby able to input an operation instruction for the facility device 20 while taking the effect on comfort into account.

(7-6) Modification 1F

With FIGS. 8 through 10, the case is described in which the display trigger for displaying the screen on the display 32a is made during the DR control period and is the input of the operation instruction for the facility device 20 to the input unit 33.

However, the display trigger may be made at any desired timing. For example, the display trigger may be made at the time when the power source of the device control apparatus 30 is started up. In this case, the expense effect presentation unit 36e presents the expense effect based on a factor such as the operation instruction for the most recently active facility device 20 when the display 32a starts up.

The display trigger may be performed at the timing when an output command (a presentation command) is issued, such as when the touch screen configuring the output unit 32 and the input unit 33 is touched. In this case, the expense effect presentation unit 36e presents the expense effect based on a factor such as the control condition for the already active facility device 20, by receiving the output command from the input unit 33 as a trigger. Convenience for the consumer is improved because the expense effect can be presented at any desired timing.

(7-7) Modification 1G

The expense effect presentation unit 36e may present the expense effect before or after the activity which is based on the operation instruction. Specifically, if only the operation instruction is inputted to the device control apparatus 30, the expense effect presentation unit 36e may calculate and present the expense effect regardless of whether or not the activity based on the operation instruction is performed. Convenience for the consumer can thereby be improved because the device control apparatus 30 presents the expense effect regardless of the timing of the activity based on the operation instruction.

(7-8) Modification 1H

Concerning the presentation of the expense effect, the expense effect presentation unit 36e may display the expense effects and the effects on comfort on the display 32a as relative values with the most recent operation contents (the last or current operation contents). For example, when the facility device 20 is an air conditioner, a display screen such as is shown in FIG. 12 may be presented.

Figure 12:
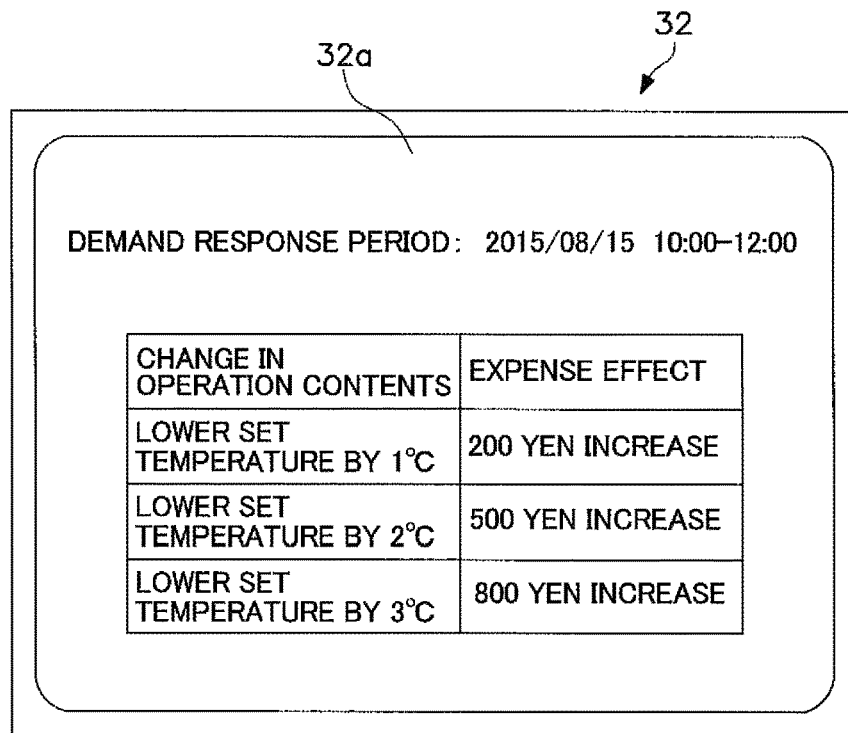
FIG. 12 is a drawing for illustrating a screen display of operation contents and expense effects in Modification 1H.

The screen example in FIG. 12 displays the expense effect for the situation where the operation contents of the facility device 20 are changed in the next demand response control period. It is displayed that if the next set temperature is decreased to the temperature of 1° C., 2° C., or 3° C. lower than the most recent set temperature, as the expense effect, the incentive will increase by 200 yen, 500 yen, or 800 yen, respectively. The consumer can thereby be prompted to set the operation instruction for the facility device 20 while being shown the change in the incentive. In other words, the consumer can judge whether to prioritize suppressing the power consumption and procuring many incentives, or to prioritize activating the air conditioner and making the indoor temperature comfortable. As a result, it can assist for the consumer to obtain incentives steadily.

Figure 13:
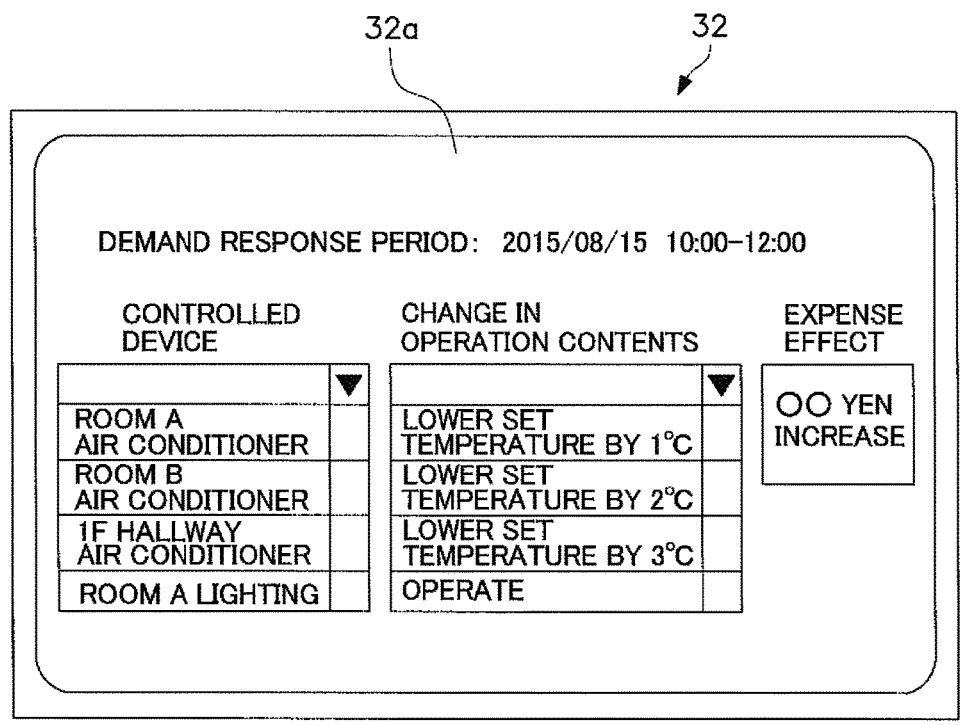
FIG. 13 is a drawing for illustrating a screen display of operation contents and expense effects in Modification 1H.

The expense effect presentation unit 36e may also present the expense effect for each facility device 20 when multiple facility devices 20 are being controlled by the DR control. The expense effect presentation unit 36e may also display a total amount of the expense effects for the situation where the same control is performed on all of the multiple facility devices 20. The expense effect presentation unit 36e may also use pull-down displays for the facility devices 20 being controlled by the DR control and for the changes in operation contents for the facility devices 20, as shown in FIG. 13.

(7-9) Modification 1I

Figure 14:
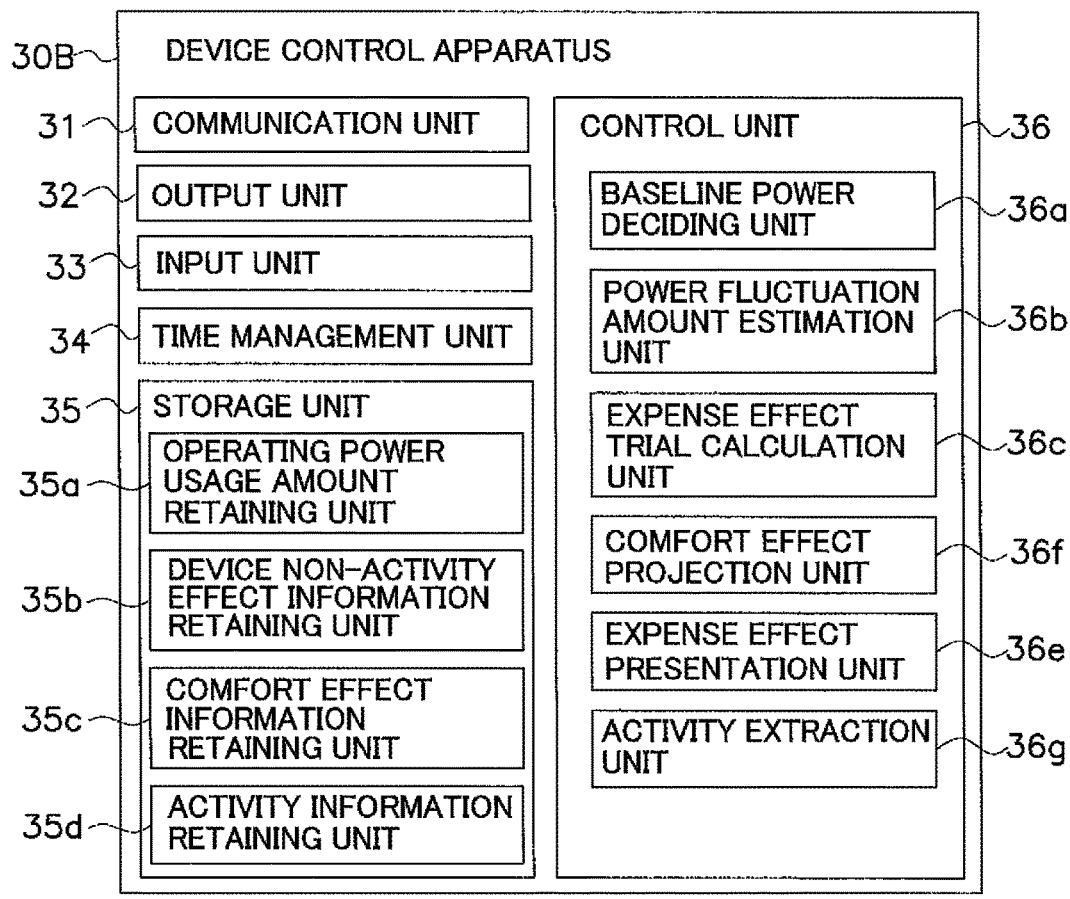
FIG. 14 is a block diagram showing a configuration of a device control apparatus 30B according to Modification 1I.

A device control apparatus 30B according to an embodiment of the present invention may present the estimation of an expense effect that will take place in the next DR control, based on the contents "operation instruction often given" in the corresponding time slot from the past operation history. FIG. 14 is a schematic diagram showing a configuration of the device control apparatus 30B according to Modification 1 H.

In the device control apparatus 30B, the storage unit 35 further has an activity information retaining unit 35d. In addition to the configuration of the device control apparatus 30, the device control apparatus 30B further includes an activity extraction unit 36g.

The activity information retaining unit 35d stores the activity in association with the expense effect and time information, when the activity based on the operation instruction has been performed.

The activity extraction unit 36g extracts activities from the activity information retaining unit 35d, which are performed during the time slot for which an adjustment of the power usage amount is requested. For example, the operations most often performed by the facility devices 20 in a specific time slot are extracted from the activity information retaining unit 35d.

The expense effect presentation unit 35e presents expense the effects for the activities extracted by the activity extraction unit 36g. For example, the expense effect presentation unit 35e outputs a display such as that shown in FIG. 15 to the display 32a. In FIG. 15, identifying information a1 of the facility devices 20, operation instructions a2 often given to the facility devices 20, and presumed expense effects a3 after the DR control period are displayed.

As described above, in the device control apparatus 30B according to Modification 1I, since the consumer can refer to the operating histories of the facility devices to examine the expense effects, the consumer can input reasonable operation instructions for the facility devices 20.

<Additional Remarks>

The present invention is not limited to the embodiment described above. The present invention, when carried out, can be embodied with modifications to the configurative elements within a range that does not deviate from the scope of the invention. Various forms of the invention can be actualized by appropriately combining multiple constituent features disclosed in the embodiment above. For example, at least one constituent features may be omitted from all of the constituent features given in the embodiment. Furthermore, a plural of constituent features may be appropriately combined with different embodiments.

What is claimed is:

1. A device control apparatus configured to perform demand response control in which an amount of energy consumed in a predetermined time slot by a facility device is adjusted in accordance with an adjustment request, the device control apparatus comprising:
   a reception unit configured to accept an operation instruction for the facility device; and
   a control unit including a CPU programmed to serve as
      an expense effect presentation unit configured to present an expense effect incurred on a charge in association with the amount of energy consumed by the facility device through an activity based on the operation instruction, the facility device being adjusted by the demand response control in the predetermined time slot, and
      a comfort effect projection unit configured to project an effect on comfort incurred in a space surrounding the facility device in association with the amount of energy consumed by the facility device through the activity based on the operation instruction, the facility device being adjusted by the demand response control in the predetermined time slot,
   the expense effect presentation unit being further configured to present the expense effect and the effect on comfort for each set of contents of the operation instruction accepted by the reception unit when the operation instruction comprises multiple types of contents, and
   the comfort effect projection unit being further configured to project the effect on comfort by suppressing an output of the facility device, returning the output of the facility device to a state prior to the suppressing, and calculating a change in the space surrounding the facility device between the suppressing and the returning.

2. The device control apparatus according to claim 1, further comprising:
   a receiving unit configured to receive charge computation information useable to compute a charge associated with the amount of energy consumed, the charge computation information being received from a host energy management apparatus that manages energy supplied to the facility device,
   the CPU being further programmed to serve as a computation unit configured
      to estimate a power fluctuation amount caused by the activity based on the operation instruction for the facility device, and
      to compute the expense effect to be presented by the expense effect presentation unit by applying the estimated power fluctuation amount to the charge computation information received by the receiving unit.

3. The device control apparatus according to claim 2, wherein
   the receiving unit is further configured to receive incentive information from the host energy management apparatus, the incentive information being included in the charge computation information and pertaining to a reward for complying with a request associated with energy consumption from the host energy management apparatus, and
   the expense effect presentation unit is further configured to present an incentive change as the expense effect, the incentive change being caused in association with the amount of energy consumed by the facility device.

4. The device control apparatus according to claim 3, wherein
   the computation unit is further configured to calculate an incentive reduction amount based on the estimated power fluctuation amount, a remaining time in the time slot for which an adjustment of the amount of energy consumed is requested as indicated by the incentive information, and an incentive unit price indicated by the incentive information, and
   the expense effect presentation unit is further configured to present an incentive reduction amount as the expense effect, the incentive reduction amount being calculated by the computation unit.

5. The device control apparatus according to claim 2, wherein
   the receiving unit is further configured to receive penalty information from the host energy management apparatus, the penalty information being included in the charge computation information and pertaining to a penalty that increases the charge when a request associated with energy consumption from the host energy management apparatus is not satisfied, and
   the expense effect presentation unit is further configured to present a penalty as the expense effect, the penalty being caused in association with the amount of energy consumed by the facility device.

6. The device control apparatus according to claim 5, wherein
   the computation unit is further configured to calculate a penalty price based on the estimated power fluctuation amount, a remaining time in the time slot for which an adjustment of the amount of energy consumed is requested as indicated by the penalty information, and a penalty unit price indicated by the penalty information, and the expense effect presentation unit is further configured to present a penalty price as the expense effect, the penalty price being calculated by the computation unit.

7. The device control apparatus according to claim 2, wherein the computation unit is further configured to calculate a computation result of the expense effect using a numerical value, and the expense effect presentation unit is further configured to present the expense effect calculated by the computation unit using the numerical value.

8. The device control apparatus according to claim 3, wherein the expense effect presentation unit is further configured to present a display indicating that the expense effect will not be affected by at least one of the incentive change and the penalty when there is no occurrence of at least one of the incentive change and the penalty caused by the activity of the facility device based on the operation instruction.

9. The device control apparatus according to claim 1, further comprising:

a display unit configured to display an effect of device non-activity caused by a situation that the activity is not performed based on the operation instruction for the facility device.

10. The device control apparatus according to claim 9, wherein the facility device is an air conditioner that performs temperature adjustment of indoor temperature, and the display unit is further configured to display an effect on the indoor temperature caused by a situation that the temperature adjustment is not performed by the air conditioner.

11. The device control apparatus according to claim 1, wherein the expense effect presentation unit is further configured to present the expense effect when the reception unit accepts the operation instruction as a trigger.

12. The device control apparatus according to claim 1, wherein the expense effect presentation unit is further configured to present the expense effect before or after the activity based on the operation instruction.

13. The device control apparatus according to claim 1, wherein the reception unit is further configured to accept a presentation instruction for the expense effect, and the expense effect presentation unit is further configured to present the expense effect when the reception unit accepts the presentation instruction as a trigger.

14. The device control apparatus according to claim 1, further comprising:

an activity information storage unit configured to store an activity in association with the expense effect and time information when the activity has been performed based on the operation instruction; and an activity extraction unit configured to extract the activity from the activity information storage unit, the activity having been performed in the time slot during which the adjustment of the amount of energy consumed is requested, the expense effect presentation unit being further configured to present the expense effect for the activity extracted by the activity extraction unit.

* * * * *